(12) United States Patent
Lutz et al.

(10) Patent No.: US 12,449,022 B2
(45) Date of Patent: Oct. 21, 2025

(54) DRIVE INCLUDING A TRANSMISSION DRIVEN BY AN ELECTRIC MOTOR

(71) Applicant: SEW-EURODRIVE GMBH & CO. KG, Bruchsal (DE)

(72) Inventors: Markus Lutz, Oberhausen-Rheinhausen (DE); Ingo Schütterle, Bruchsal (DE); Torsten Koker, Stutensee (DE); Markus Wöppermann, Karlsbad (DE); Sascha Haller, Karlsruhe (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

(21) Appl. No.: 18/847,000

(22) PCT Filed: Feb. 22, 2023

(86) PCT No.: PCT/EP2023/054479
§ 371 (c)(1),
(2) Date: Sep. 13, 2024

(87) PCT Pub. No.: WO2023/174660
PCT Pub. Date: Sep. 21, 2023

(65) Prior Publication Data
US 2025/0224022 A1   Jul. 10, 2025

(30) Foreign Application Priority Data

Mar. 15, 2022 (DE) .......................... 102022000902.1

(51) Int. Cl.
*F16H 3/44* (2006.01)
*F16H 57/02* (2012.01)

(52) U.S. Cl.
CPC ............... *F16H 3/44* (2013.01); *F16H 57/02* (2013.01); *F16H 2057/02034* (2013.01); *F16H 2057/02043* (2013.01)

(58) Field of Classification Search
CPC .. F16H 3/44; F16H 57/02; F16H 2057/02034; F16H 2057/02043
See application file for complete search history.

(56) References Cited

U.S. PATENT DOCUMENTS

| | | | |
|---|---|---|---|
| 2012/0174883 A1* | 7/2012 | Kokubo | F01L 1/352 123/90.15 |
| 2014/0162826 A1 | 6/2014 | Sato | |

(Continued)

FOREIGN PATENT DOCUMENTS

| | | |
|---|---|---|
| DE | 112012003027 T5 | 5/2014 |
| EP | 2474757 A1 | 7/2012 |
| JP | 2010-038362 A | 2/2010 |

OTHER PUBLICATIONS

International Report on Patentability issued in corresponding International Application No. PCT/EP2023/054479, dated Sep. 10, 2024, pp. 1-11, English Translation.

(Continued)

*Primary Examiner* — Farhana Pervin
(74) *Attorney, Agent, or Firm* — Carter, DeLuca & Farrell LLP

(57) ABSTRACT

A drive includes a transmission driven by an electric motor. A drive shaft of the transmission has multiple eccentric regions with differing widths in the axial direction, in which the high points thereof are offset relative to one another in the circumferential direction. The respective eccentric region is radially surrounded by a respective cam disk region, e.g., of a housing part of the transmission. Respective rollers are accommodated in respective recesses of a cage and arranged with a radial degree of freedom. The cage is rotationally fixed to the output shaft of the transmission, and the output shaft along with the cage is rotatably mounted both relative to the cam disk regions and relative to the drive shaft. During operation, the respective rollers are made to (Continued)

roll and/or slide on the respective cam disk region by the respective eccentric region. The eccentric regions are arranged behind one another in the axial direction such that the dynamic imbalance is minimized and/or eliminated.

23 Claims, 22 Drawing Sheets

(56) References Cited

U.S. PATENT DOCUMENTS

2017/0063193 A1\* 3/2017 Volak .................. F16C 19/48
2023/0279926 A1\* 9/2023 Lin .................. F16H 57/0428
301/6.5

OTHER PUBLICATIONS

International Search Report issued in corresponding International Application No. PCT/EP2023/054479 dated May 31, 2023, pp. 1-2, English Translation.

\* cited by examiner

DRIVE INCLUDING A TRANSMISSION DRIVEN BY AN ELECTRIC MOTOR

FIELD OF THE INVENTION

The present invention relates to a drive including a transmission driven by an electric motor.

BACKGROUND INFORMATION

In certain conventional systems, in a planetary transmission, planetary gears mesh with a sun gear and a ring gear.

German Patent Document No. 39 06 053 describes a transmission in the form of a tension-wave gearing.

A reduction bearing with an electric motor is described in U.S. Patent Application Publication No. 2017/0063193.

A control system for a vehicle is described in PCT Patent Document No. WO 2019/186330.

A transmission is described in German Patent Document No. 10 2013 011 799.

SUMMARY

Example embodiments of the present invention provide a transmission with a high transmission ratio, high transmitted torque, and high torsional rigidity in a compact and stable manner.

According to example embodiments, a drive has a transmission driven by an electric motor.

A drive shaft, e.g., a hollow shaft, of the transmission has multiple eccentric regions with differing widths in the axial direction, the high points of which are offset relative to one another in the circumferential direction.

The respective eccentric region is radially surrounded by a respective cam disk region, e.g., of a housing part of the transmission.

Respective rollers are accommodated in respective recesses of a cage and arranged with a radial degree of freedom, e.g., radially movable back and forth.

For example, the respective recesses are formed radially passing through the cage and are evenly spaced from one another in the circumferential direction.

For example, cage is rotationally fixed to the output shaft.

The cage is rotationally fixed to the output shaft of the transmission, e.g., is formed in one piece, e.g., in one part.

The output shaft along with the cage is rotatably mounted both relative to the cam disk regions and relative to the drive shaft.

The e.g., first recesses of the cage are rectangular slot-shaped, and for example, the extension of the rectangular slot-shaped recess is greater in the axial direction than in the circumferential direction.

For example, the respective axial end region of the slot-shaped recess is rounded and/or arranged as a semicircle.

On a first spacer ring radially projecting nubs project into the recesses and axially delimit the first rollers, e.g., which are accommodated in the first recesses, for example.

For example, a respective one of the nubs of the first spacer ring projects into a first recess and axially, e.g., in the axial direction, delimits a first roller accommodated in this first recess, and a nub of the first spacer ring next adjacent to this respective first nub of the first spacer ring projects into a respective second recess of the cage and axially delimits the second roller accommodated in this second recess, e.g., against the axial direction.

For example, the second recess is axially spaced from the first recess.

During operation, e.g., when the drive shaft rotates, the respective rollers are made to roll and/or slide on the respective cam disk region by the respective eccentric region.

For example, the widths $B\_i$ of the eccentric regions and the circumferential angle positions $\alpha\_i$ of the high points associated with the respective eccentric region are formed such that the sum of all products $B\_i*\cos(\alpha\_i)$ is eliminated and that the sum of all products $B\_i*\sin(\alpha\_i)$ is eliminated, i numbers the eccentric regions, i.e., for example, has values from 1 to N and N is the number of eccentric regions.

The eccentric regions are arranged behind one another in the axial direction such that the dynamic imbalance is minimized and/or eliminated.

Thus, the rollers are axially delimited by the spacer ring, which can be made of a material that is softer than the material of the cage. Thus, lower-noise operation is possible, as metal-to-metal contact of the metal rollers on the metal cage in the axial direction is avoided.

Furthermore, a high torque and a high transmission ratio can be transmitted in a compact space, and the drive can be arranged to be stable and torsionally rigid. This is because the cage can be arranged to be in one piece, e.g., in one part, with the output shaft. The cage can also be fitted with a second row of rollers, i.e., second rollers. This ensures a particularly stable transmission, i.e., smooth running during torque transmission.

By using a plurality of rows of rollers, the radial forces can be reduced when the drive shaft is balanced. In addition, rollers with differing widths can be used and thus a symmetrical arrangement can be provided. For example, an axially wider row of rollers is surrounded by two axially narrower rows of rollers.

For example, at least three eccentric regions are provided, of which at least two have an axial width that differs from one another. This provides for the smoothest possible turning operation and allows for high lateral forces to be absorbed.

A statically and dynamically balanced design can be achieved if the sum of the products of width and cosine or sine of the eccentric high point circumferential angle position is eliminated or at least becomes as small as possible in terms of magnitude.

According to example embodiments, a drive has a transmission driven by an electric motor, and a drive shaft, e.g., a hollow shaft, of the transmission has multiple eccentric regions with differing widths in the axial direction, in which the high points thereof are offset relative to one another in the circumferential direction.

The respective eccentric region is radially surrounded by a respective cam disk region, e.g., of a housing part of the transmission.

Corresponding to the different widths of the respective eccentric regions, rollers with differing widths in the axial direction are accommodated in respective recesses of a cage and arranged with a radial degree of freedom, e.g., radially movable back and forth.

For example, the respective recesses are formed radially passing through the cage.

The cage is rotationally fixed to the output shaft of the transmission, e.g., is formed in one piece, e.g., in one part.

The output shaft along with the cage is rotatably mounted both relative to the cam disk regions and relative to the drive shaft.

The, e.g., first recesses of the cage are rectangular slot-shaped, e.g., the extension of the rectangular slot-shaped recess being greater in the axial direction than in the circumferential direction.

For example, the respective axial end region of the slot-shaped recess is rounded and/or arranged as a semi-circle.

On a first spacer ring radially projecting nubs project into the recesses and axially delimit the first rollers, e.g., which are accommodated in the first recesses, for example.

For example, a respective one of the nubs of the first spacer ring projects into a first recess and axially, e.g., in the axial direction, delimits a first roller accommodated in this first recess, and a nub of the first spacer ring next adjacent to this respective first nub of the first spacer ring projects into a respective second recess of the cage and axially delimits the second roller accommodated in this second recess, e.g., against the axial direction.

For example, the second recess is axially spaced from the first recess.

During operation, e.g., when the drive shaft rotates, the respective rollers are made to roll and/or slide on the respective cam disk region by the respective eccentric region.

For example, the widths $C\_i$ of the rollers made to roll by the respective eccentric region, which has the width $C\_i$, and the circumferential angular positions $x\_i$ of the high points associated with the respective eccentric region are formed such that the sum of all products $C\_i * \cos(\alpha\_i)$ is eliminated and that the sum of all products $C\_i * \sin(\alpha\_i)$ is eliminated, in which i numbers the eccentric regions, i.e., for example, has values from 1 to N and N is the number of eccentric regions.

The rollers and/or eccentric regions with differing widths are arranged behind one another in the axial direction such that the dynamic imbalance is minimized and/or eliminated.

For example, the cage is rotationally fixed to the output shaft.

Thus, the rollers are axially delimited by the spacer ring, which can be made of a material that is softer than the material of the cage. Thus, lower-noise operation is possible, as metal-to-metal contact of the metal rollers on the metal cage in the axial direction is avoided.

Furthermore, a high torque and a high transmission ratio can be transmitted in a compact space, wherein the drive can be configured to be stable and torsionally rigid. This is because the cage can be arranged to be in one piece, e.g., in one part, with the output shaft. The cage can also be fitted with a second row of rollers, i.e., second rollers. This ensures a particularly stable transmission, i.e., smooth running during torque transmission.

By using a plurality of rows of rollers, the radial forces can be reduced when the drive shaft is balanced. In addition, rollers with differing widths can be used and thus a symmetrical arrangement can be provided. For example, an axially wider row of rollers is surrounded by two axially narrower rows of rollers.

For example, at least three eccentric regions are provided, of which at least two have an axial width that differs from one another. This provides for the smoothest possible turning operation and allows for high lateral forces to be absorbed.

A statically and dynamically balanced configuration can be achieved if the sum of the products of width and cosine or sine of the eccentric high point circumferential angle position is eliminated or at least becomes as small as possible in terms of magnitude.

According to example embodiments, a drive has a transmission driven by an electric motor, in which a drive shaft, e.g., a hollow shaft, of the transmission has a first eccentric region. The first eccentric region is radially surrounded by a first cam disk region, e.g., of a housing part of the transmission, and first rollers are accommodated in first recesses of a cage and arranged with a radial degree of freedom, e.g., radially movable back and forth. For example, the first recesses are formed radially passing through the cage. The drive shaft, e.g., the hollow shaft, of the transmission has a second eccentric region, the second eccentric region is radially surrounded by a second cam disk region, e.g., of the housing part of the transmission, and second rollers are accommodated in second recesses of the cage and arranged with a radial degree of freedom, e.g., radially movable back and forth. For example, the second recesses are formed radially passing through the cage, the drive shaft, e.g., the hollow shaft, of the transmission has a third eccentric region, the third eccentric region is radially surrounded by a third cam disk region, e.g., of a housing part of the transmission, and third rollers are accommodated in third recesses of the cage and arranged with a radial degree of freedom, e.g., radially movable back and forth. For example, third recesses are formed radially passing through the cage.

The cage is rotationally fixed to the output shaft of the transmission, e.g., is formed in one piece, e.g., in one part.

The first eccentric region is arranged in the axial direction between the second and the third eccentric region, e.g., the axial direction being parallel to the axis of rotation of the drive shaft.

The output shaft along with the cage is rotatably mounted both relative to the cam disk regions and relative to the drive shaft.

The, e.g., first recesses of the cage are rectangular slot-shaped, e.g., the extension of the rectangular slot-shaped recess being greater in the axial direction than in the circumferential direction.

For example, the respective axial end region of the slot-shaped recess is rounded and/or arranged as a semi-circle.

On a first spacer ring radially projecting nubs project into the recesses and axially delimit the first rollers, e.g., which are accommodated in the first recesses, for example.

For example, a respective one of the nubs of the first spacer ring projects into a first recess and axially, e.g., in the axial direction, delimits a first roller accommodated in this first recess, and a nub of the first spacer ring next adjacent to this respective first nub of the first spacer ring projects into a respective second recess of the cage and axially delimits the second roller accommodated in this second recess, e.g., against the axial direction.

For example, the second recess is axially spaced from the first recess.

During operation, e.g., when the drive shaft rotates, the respective rollers are made to roll and/or slide on the respective cam disk region by the respective eccentric region.

For example, the first rollers are made to roll and/or slide on the first cam disk region by the first eccentric region, the second rollers are made to roll and/or slide on the second cam disk region by the second eccentric region, and the third rollers are made to roll and/or slide on the third cam disk region by the third eccentric region.

Thus, the rollers are axially delimited by the spacer ring, which can be made of a material that is softer than the material of the cage. Thus, lower-noise operation is possible, as metal-to-metal contact of the metal rollers on the metal cage in the axial direction is avoided.

Furthermore, a high torque and a high transmission ratio can be transmitted in a compact space, and the drive can be adapted to be stable and torsionally rigid. This is because the cage can be arranged to be in one piece, e.g., in one part, with the output shaft. The cage can also be fitted with a second row of rollers, i.e., second rollers. This ensures a particularly stable transmission, i.e., smooth running during torque transmission.

The direct bearing arrangement of the rolling body in the manner of a barrel bearing or crossed roller bearing allows axial forces and radial forces to be minimized. High torques can thus be transmitted to the output shaft. This is because the output shaft is mounted stably. The torque is introduced from the rollers to the cage, which passes on the torque to the hollow output shaft, from which the torque is passed on via the flange block interface formed on the output shaft to the device to be driven by the transmission.

By using three rows of rollers, the radial forces can be reduced when the drive shaft is balanced. In addition, rollers with differing widths can be used and thus a symmetrical arrangement can be provided. For example, an axially wider row of rollers is surrounded by two axially narrower rows of rollers.

For example, at least three eccentric regions are provided, of which at least two have an axial width that differs from one another. This provides for the smoothest possible turning operation and allows for high lateral forces to be absorbed.

A statically and dynamically balanced configuration can be achieved if the sum of the products of width and cosine or sine of the eccentric high point circumferential angle position is eliminated or at least becomes as small as possible in terms of magnitude.

According to example embodiments, the sum of the axial width of the second eccentric region and the third eccentric region equals the axial width of the first eccentric region. Thus, the resulting radial force is minimized and the transmission is statically and dynamically balanced.

According to example embodiments, the first housing part is connected to a second housing part. The output shaft along with the cage is rotatably mounted both relative to the cam disk regions and relative to the drive shaft. By the output shaft having a wedge-shaped and/or V-shaped groove that is uninterrupted and/or fully circumferential in the circumferential direction, e.g., a groove that is open radially outwards, in which rolling bodies, e.g., cylindrical, barrel-shaped rolling bodies or spherical rolling bodies, are accommodated. A V-shaped recess, e.g., a V-shaped recess open radially inwards, is provided and/or formed, which is delimited in the axial direction by the first housing part and against the axial direction by the second housing part. For example, a first rolling region of the rolling body is arranged on a flank of the wedge-shaped or V-shaped groove and a second rolling region of the rolling body is arranged on the first housing part or on the second housing part. For example, the V-shaped recess is arranged radially outside the V-shaped groove. For example, the second housing part has axial bores for connecting a device to be driven by the transmission of the drive. For example, the output shaft has axial bores at its axial end region facing away from the cage, e.g., for connecting to a rotatably mounted part of the device to be driven. Thus, a stable bearing arrangement in the manner of a barrel bearing or crossed roller bearing is possible and radial and axial forces can thus be diverted. Thus, the transmission of high torques is permitted without radial or axial forces being able to damage the bearing arrangement.

According to example embodiments, a stiffening ring is shaped on the cage, e.g., formed, e.g., on the side facing away from the axial bores of the output shaft. For example, the stiffening ring is aligned coaxially to the tubular cage and coaxially to the output shaft. For example, the radial wall thickness of the cage in the region covered by the stiffening ring in the axial direction is greater than the wall thickness of the cage outside this region. Thus, a high torque can be introduced from the rollers to the cage and the cage can be sufficiently stiffened by the stiffening ring. For example, the stiffening ring is arranged on the side of the cage axially facing away from the flange block interface, i.e., the axial bores, of the output shaft, so that the torque can be introduced axially between the stiffening ring and the output shaft.

According to example embodiments, the, e.g., first recesses of the cage are rectangular in shape, and relief notches project in the axial direction in the corner regions of the rectangular recesses. The distance between two relief notches measured in the circumferential direction decreases monotonically, e.g., strictly monotonically, in the axial direction and/or with increasing distance from the rectangle. Thus, the first recesses do not have any sharp corners on the rectangular basic shape, which means that the force-tension curves in the cage can be optimized. A particularly suitable stress force curve in the cage can be achieved due to the relief notches which get closer and closer in the circumferential direction with increasing axial distance. In addition, the respective dovetail-like axial end region is provided with sufficient material to ensure the axial delimitation of the rollers, e.g., with the greatest possible expansion of the limiting material in the circumferential direction.

According to example embodiments, the first recesses of the cage, for example, are rectangular slot-shaped. For example, the respective axial end region of the slot-shaped recess is rounded and/or arranged as a semicircle. On a first spacer ring radially projecting nubs project into the recesses and axially delimit the first rollers, e.g., which are accommodated in the first recesses, for example. For example, a respective one of the nubs of the first spacer ring projects into a first recess and axially, e.g., in the axial direction, delimits a first roller accommodated in this first recess, and a nub of the first spacer ring next adjacent to this respective first nub of the first spacer ring projects into a respective second recess of the cage and axially delimits the second roller accommodated in this second recess, e.g., against the axial direction. For example, the second recess is axially spaced from the first recess. Thus, the spacer rings can be made of a material that is softer than the material of the cage, so that low-noise operation of the transmission can be achieved. For example, the spacer rings are made of plastic.

According to example embodiments, the inner radius of the first cam disk region, e.g., the radial distance of the cam disk region in relation to the axis of rotation of the drive shaft, depends periodically on the circumferential angle, e.g., on the circumferential angle in relation to the axis of rotation of the shaft, e.g., is not constant. For example, the first cam disk region in the axial direction includes the region covered by the respective first roller in the axial direction. Thus, the cam disk region is readily produced, and the transmission ratio can be preset due to the periodicity.

According to example embodiments, the outer radius of the drive shaft in the respective eccentric region depends on the circumferential angle, i.e., for example, is not constant, e.g., the dependence of the outer radius having only a single maximum and a single minimum as a function of the circumferential angle. Thus, ready production is possible. In addition, an eccentric region can be formed on the input shaft and the subsequent fine machining can be carried out cost-effectively. The transmission ratio can be varied or achieved by the eccentricity, the periodicity and the number of rollers or the diameter of the rollers.

According to example embodiments, the axial region covered by the respective eccentric region at least overlaps with the axial region covered by the cam disk region. The cam disk region touches the same roller as the respective eccentric region. Thus, the roller transmits the highest possible forces, as it is in contact with the eccentric region and the drive shaft over its entire axial length. In addition, the rollers can be arranged radially between the two regions and in the same axial region.

According to example embodiments, the drive shaft is rotationally fixed to the rotor shaft of the electric motor or is driven by the rotor shaft of the electric motor via one or a plurality of gear stages. For example, a first toothed part is rotationally fixed to the rotor shaft, and a second toothed part is rotationally fixed to the drive shaft. Thus, a higher torque can be transmitted.

According to example embodiments, the cam disk regions are formed on the inside of the first housing part of the transmission. The first housing part is connected to a second housing part. Rolling bodies of a bearing arrangement of the output shaft are delimited by the first housing part, by the second housing part and by the output shaft, e.g., the output shaft having a running surface for the rolling bodies and the second housing part has a running surface for the rolling bodies. For example, the output shaft has a V-shaped, fully circumferential in the circumferential direction, e.g., uninterrupted, annular groove in which the rolling bodies are accommodated. For example, a further V-shaped recess, which is fully circumferential in the circumferential direction, e.g., uninterrupted, in which the rolling bodies are accommodated and which has an orientation reversed to the V-shaped annular groove, is formed and/or edged by the first and second housing part. Thus, a compact arrangement is possible. Thus, a compact configuration is possible. This is because no separate outer ring and inner ring are required for the bearing arrangement.

According to example embodiments, a bearing, e.g., an eccentric bearing, is fitted on the first eccentric region, on which, e.g., on its outer ring, the first rollers roll and/or slide directly or on which a ring is fitted, on which the first rollers roll and/or slide. For example, the bearing is arranged as a cylindrical roller bearing or a barrel bearing. Thus, ready production is possible and no additional part is required.

According to example embodiments, the inner radius of the respective cam disk region, e.g., the radial distance of the respective cam disk region in relation to the axis of rotation of the shaft, depends on the circumferential angle, e.g., the circumferential angle in relation to the axis of rotation of the shaft, and thus is periodic, e.g., not constant. Thus, ready easy production is possible.

According to example embodiments, the outer radius of the shaft in the respective eccentric region depends on the circumferential angle, e.g., is thus not constant. For example, the dependence of the outer radius only has a single maximum and a single minimum as a function of the circumferential angle. Thus, ready production is possible.

According to example embodiments, the axial region covered by the respective eccentric region at least overlaps with the axial region covered by the respective associated cam disk region. Thus, the widest possible axial contact is possible.

According to example embodiments, a respective bearing, e.g., a ball bearing, is fitted on the respective eccentric region, on which, e.g., on its outer ring, the first rollers roll and/or slide directly or on which a respective ring is fitted, on which the first rollers roll and/or slide. Thus, friction losses are kept to a minimum.

According to example embodiments, the cam disk regions are formed integrated in one or the first housing part, which is connected to one or the second housing part, in which the bearing arrangement is accommodated, which rotatably supports the output shaft. For example, the respective inner ring of this bearing arrangement is accommodated on the output shaft and the respective outer ring of this bearing is accommodated in the second housing part. Thus, the transmission is arranged to be as compact as possible.

According to example embodiments, a shaft seal ring, e.g., an inner shaft seal ring, is accommodated in the output shaft, which shaft seal ring seals towards the drive shaft, e.g., the sealing lip of which runs on the drive shaft. A further shaft seal ring, e.g., an outer shaft seal ring, is accommodated in the second housing part, which shaft seal ring seals towards the output shaft, e.g., the sealing lip of which runs on the output shaft or runs on a ring part fitted on the output shaft. Thus, a high type of protection can be achieved.

According to example embodiments, a third housing part, e.g., an adapter housing, is connected to the first housing part, e.g., by connecting screws evenly spaced in the circumferential direction. The third housing part is connected to the housing of the electric motor which drives a first gear wheel which is in mesh with a second gear wheel which is rotationally fixed to the drive shaft. The third housing part at least partially surrounds the first and second gear to form the housing. Thus, ready production is possible.

According to example embodiments, the recesses of the cage are rectangular in shape, and relief notches are arranged in the corner regions of the rectangular recesses. The distance between respectively two relief notches decreases monotonically, e.g., strictly monotonically, with increasing distance from the respective rectangle. Thus, a long service life can be achieved and a high torque can be transmitted.

According to example embodiments, the recesses of the cage are rectangular slot-shaped. For example, the respective end region of the slot-shaped recess is rounded. Nubs projecting from a first spacer ring radially project into recesses and axially delimit the rollers. For example, a respective one of the nubs projects into a first recess and delimits a first roller, and a nub nearest to this respective first nub projects into a second recess and axially delimits the second roller accommodated in this second recess. For example, the second recess is axially spaced from the first recess.

Thus, highly resilient recesses that do not have notches can be used in the cage. Thus, a long service life can be achieved for the transmission. The axial spacing of the rollers is damped by the respective spacer ring made of plastic.

According to example embodiments, the drive shaft is rotationally fixed to the rotor shaft of the electric motor or is driven by the rotor shaft of the electric motor via one or a plurality of gear stages. For example, a first toothed part is rotationally fixed to the rotor shaft and a second toothed part is rotationally fixed to the drive shaft. Thus, it is possible to drive the input shaft directly or indirectly via a gear stage.

It is important to note that the gear stage can apply a higher torque or breakaway torque than when driven directly by the electric motor.

According to example embodiments, the input shaft is rotatably mounted relative to the cage with the output shaft by a bearing, e.g., a roller bearing, e.g., a ball bearing. For example, the outer ring of the bearing is accommodated by the output shaft, e.g., is set against a stage of the output shaft, and the inner ring of the bearing is fitted onto the input shaft, e.g., is set against a stage of the input shaft. Thus, the relative speed of the bearing is lower than with a bearing arrangement of the input shaft towards the housing.

This means that lower losses can be achieved. In addition, an improvement in stability can be achieved, as the relative alignment of the input shaft to the cage can be achieved with high precision.

According to example embodiments, a bearing, e.g., a cylindrical roller bearing, barrel bearing, or ball bearing, is fitted onto the respective first eccentric region. The first rollers roll and/or slide directly on the first eccentric region or on which a ring is fitted, on which the first rollers roll and/or slide. Thus, a reduction in friction losses can be achieved, as well as improved smooth running.

According to example embodiments, the drive shaft, e.g., the hollow shaft, of the transmission has a second eccentric region which has an offset angle, e.g., an offset angle of 180° or an offset angle of 360°/P, where P is the number of eccentric regions of the input shaft, in the circumferential direction relative to the first eccentric region. The second eccentric region is radially surrounded by a second cam disk region, and second rollers are also accommodated in the cage with a radial degree of freedom, e.g., radially movable back and forth. During operation, e.g., when the shaft is rotating and inputting, the second rollers are made to roll and/or slide on the second cam disk region by the second eccentric region. Thus, greater stability and smoother running can be achieved by reducing the imbalance.

According to example embodiments, the inner radius of the second cam disk region, e.g., the radial distance of the second cam disk region relative to the axis of rotation of the input shaft, depends periodically on the circumferential angle, e.g., on the circumferential angle relative to the axis of rotation of the input shaft, and, for example, is not constant. For example, the number of periods of the first cam disk region is equal to the number of periods of the first cam disk region and thus the transmission can be operated, e.g., with a reduction of the imbalance. This is because an appropriate radial distribution of the eccentrics reduces the imbalance.

For example, the number of periods of the curve regions are equal to each other so that the transmission is ready for operation. The imbalance can be reduced by offsetting the eccentric regions in the circumferential direction. For example, an offset angle in the circumferential direction of 360° divided by the number of eccentric regions is provided.

If the number of periods is chosen appropriately, the eccentrics can be distributed such that, on the one hand, the imbalance is minimized, and, on the other hand, the cam disc regions can be configured to be congruent in the circumferential direction, so that the cam disc regions of all roller rows can be arranged as a single long cam disc region in a cam disc component, within which the roller rows are arranged axially offset to each other. This means that the cam disk regions of all roller rows can be represented in a single, e.g., common, component, which provides for economical manufacturability and ready assembly.

According to example embodiments, the outer radius of the input shaft in the second eccentric region depends on the circumferential angle, and, for example, is thus not constant. For example, the dependence of the outer radius has only a single maximum and a single minimum as a function of the circumferential angle. Thus, ready and inexpensive production is possible, yet a high torque can be transmitted and a high transmission ratio can be achieved.

According to example embodiments, the axial region covered by the second eccentric region overlaps at least with the axial region covered by the second cam disk region. Thus, the rollers can be arranged radially between the two regions and in the same axial region.

According to example embodiments, a bearing, e.g., a ball bearing, is fitted onto the first eccentric region, on which, e.g., on its outer ring, the first rollers roll and/or slide directly or on which a ring is fitted, on which the first rollers roll and/or slide. Thus, a reduction in friction losses can be achieved.

According to example embodiments, a first and second cam disk region are formed integrated in a first housing part which is connected to a second housing part in which bearings are accommodated which rotatably mount the output shaft. For example, the respective inner ring of these bearings is accommodated on the output shaft and the respective outer ring of these bearings is accommodated in the second housing part. Thus, ready and robust production is possible. With the same number of periods in the first and second cam disk regions, these two cam disk regions can be produced by a single cam disk region which includes the axial region covered by the first cam disk region and the axial region covered by the second cam disk region in the axial direction, thus providing for ready and cost-effective production, e.g., since only one single part can be used for all cam disk regions.

If necessary, more than two cam disk regions can also be integrated in one housing part. If the number of periods is chosen appropriately a, for example, sufficiently long, cam disk region can be used for all rows of rollers, which increases the cost-effectiveness of production.

According to example embodiments, a shaft seal ring, e.g., an inner shaft seal ring, is accommodated in the output shaft, which seals towards the input shaft, e.g., the sealing lip of which runs on the input shaft. A further shaft seal ring is accommodated in the second housing part, which seals towards the output shaft, e.g., the sealing lip of which runs on the output shaft or runs on a ring part fitted on the output shaft. Thus, a seal against oil can be created radially inwards and radially outwards. This means that oil can be provided in the interior of the transmission.

According to example embodiments, a third housing part, e.g., an adapter housing, is connected to the first and second housing parts, e.g., by connecting screws that are evenly spaced in the circumferential direction. The third housing part is connected to the housing of the electric motor, and the third housing part at least partially surrounds the first and second gear to form the housing. Thus, the housing parts are pressed towards each other by the connecting screws, which creates a stable enclosure.

According to example embodiments, the cage for accommodating the first rollers has first recesses which are regularly spaced from one another in the circumferential direction, e.g., evenly spaced. For example, the first recesses on the cage are arranged in the same radial and axial position. Thus, the, e.g., rectangular, recesses with relief notches at the corners of the rectangle ensure the smoothest possible running, especially with a large number of rollers.

According to example embodiments, the cage for receiving the second rollers has second recesses which are regularly spaced from one another in the circumferential direction, e.g., evenly spaced. For example, the second recesses on the cage are arranged in the same radial and axial position. Thus, smoother running and higher torque transmission can be achieved.

According to example embodiments, the first recesses are offset from the second recesses in the circumferential direction, in which the number N of the first recesses is the same as the number of the second recesses. For example, the offset is 360°/N, where N is the number of first recesses.

Thus, smoother running can be achieved with an increasing number. In addition, the torque is then distributed over a larger number of rollers, so that a higher torque can be transmitted overall.

In this document, the term "inputting" is always subsumed under "driving".

Further features and aspects of example embodiments of the present invention are explained in more detail below with reference to the appended schematic Figures.

DETAILED DESCRIPTION

Figure 1:
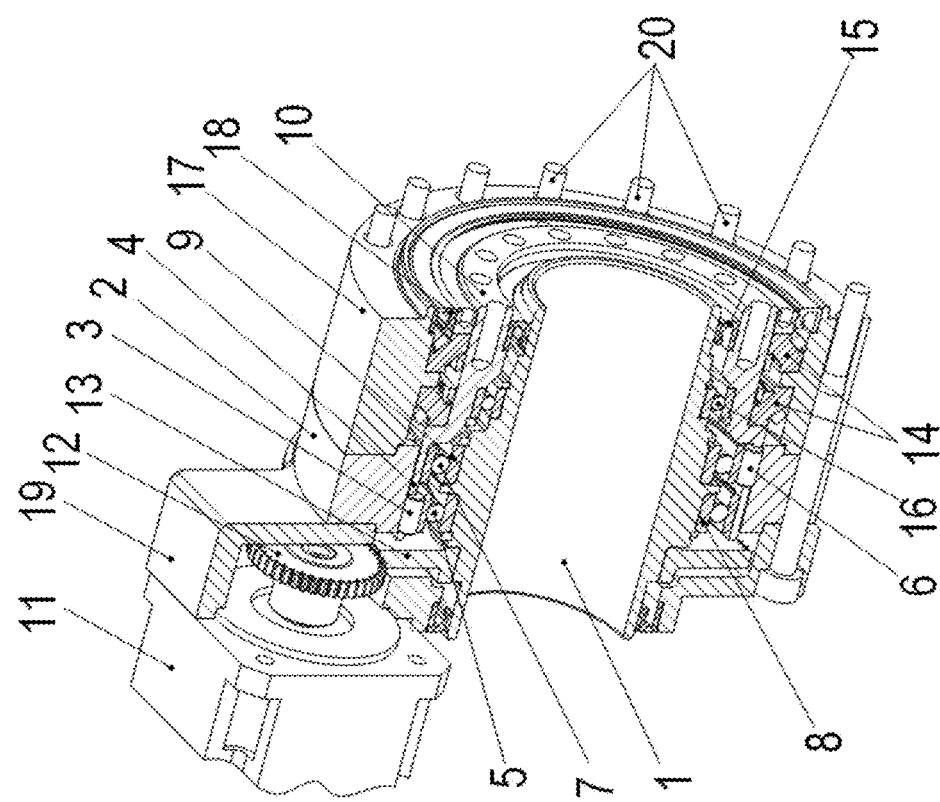
FIG. 1 is a cross-sectional view of a drive.
Figure 2:
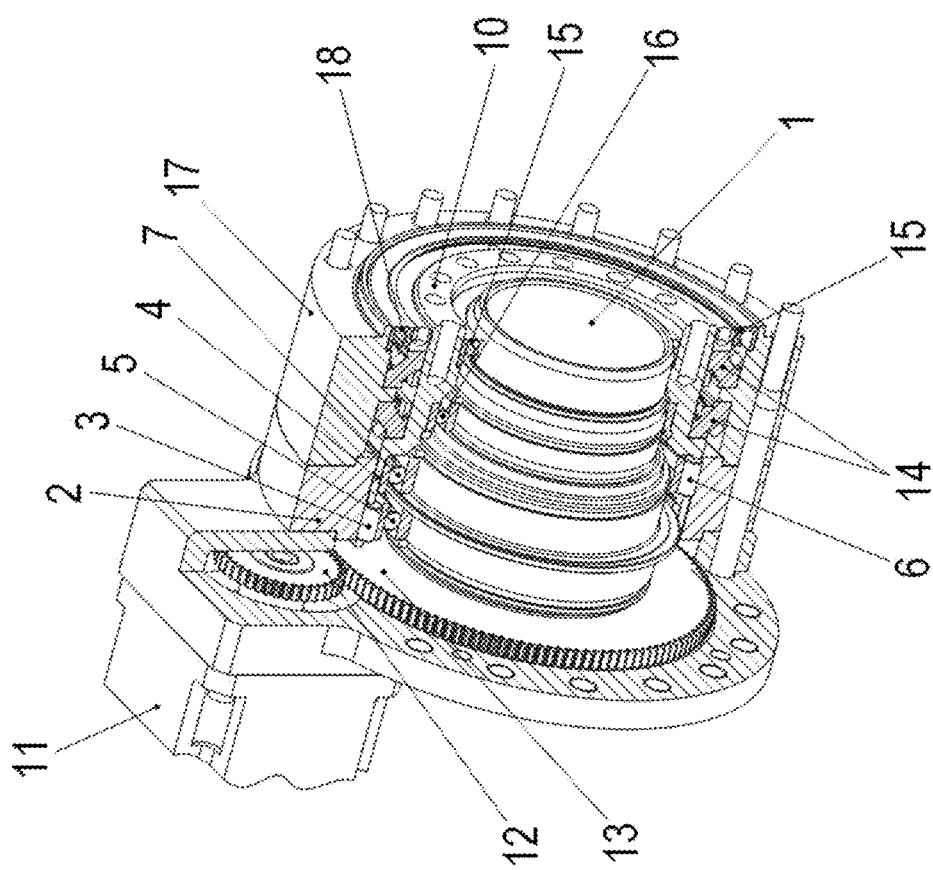
FIG. 2 is a cross-sectional view of the drive.
Figure 3:
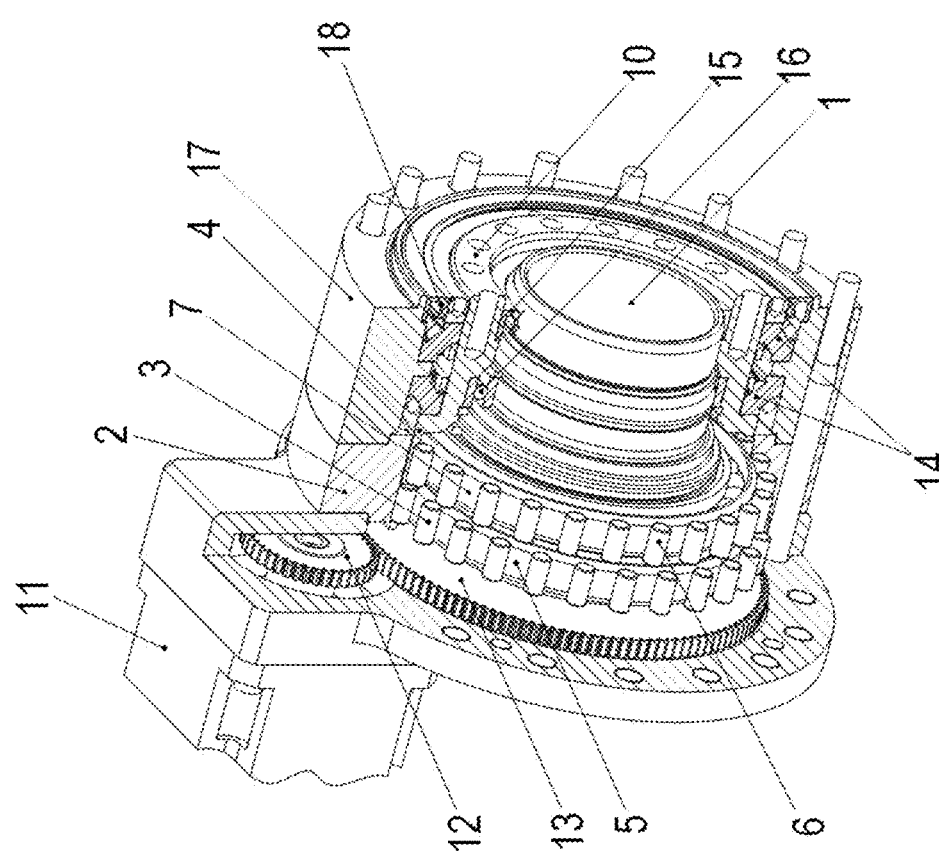
FIG. 3 is a cross-sectional view of the drive.

As illustrated in FIGS. 1 to 6, a first gear 12 is rotationally fixed to the rotor shaft of an electric motor 11 and drives a second gear 13, which meshes with the first gear.

The second gear 13 is rotationally fixed to the hollow shaft 1, which has a first eccentric region 8 and a second eccentric region 9 axially spaced therefrom.

In the respective eccentric region (8, 9), the outer radius as a function of the circumferential angle is not constant, but depends on the circumferential angle. For example, the function has a single maximum and a single minimum.

The hollow shaft 1 acts as an input shaft and can also be referred to as a drive shaft.

The circumferential angle associated with the maximum of the first eccentric region 8 is at a distance in the circumferential direction from the circumferential angle associated with the maximum of the second eccentric region 9.

The outer circumference of the respective eccentric region (8, 9) is circular-cylindrical, i.e., circular, for example. This means that a first bearing 5 can be placed on the first eccentric region 8 and a second bearing 7 can be placed on the second eccentric region 9.

The first bearing 5 can be configured as a ball bearing and the second bearing 7 can also be configured as a ball bearing.

First rollers are provided on the outer circumference of the first bearing 5, which either roll and/or slide directly on the outer ring of the first bearing 5 or on a ring pushed onto the outer ring of the first bearing 5.

These first rollers 3 are held in a cage 4 and are thus spaced apart from one another in the circumferential direction. This is because the cage 4 has a recess for each first roller 3, in which recess the roller 3 is accommodated. The recesses are, for example, shaped in the same manner, e.g., identically, and/or arranged at the same radial distance and/or cover the same axial region.

The second rollers 6 are also held axially spaced from the first rollers 3 in a cage 4 and are thus spaced apart from each other in the circumferential direction. This is because the cage 4 has a second recess for every second roller 6, in which this second roller 6 is accommodated. The second recesses are, for example, shaped in the same manner, e.g., identically, and/or arranged at the same radial distance and/or cover the same axial region.

Each of the first and second rollers thus touches the respective eccentric region radially inwards.

The first rollers touch a first cam disk region formed on the inside of a first housing part 2 radially outwards and roll on it.

This first cam disk region has an inner radius that is periodically dependent on the circumferential angle, e.g., sinusoidally dependent. The cam disk region is formed in one piece, i.e., in one part, with the housing part 2.

The cam disk region has a discrete rotational symmetry, e.g., the count of which is equal to the number of complete periods formed in the circumferential direction.

The associated axis of symmetry of the rotational symmetry is identical to the axis of rotation of the hollow shaft 1.

The second rollers 6 touch a second cam disk region formed on the inside of the first housing part 2 radially outwards and roll on it.

This second cam disk region has an inner radius that is periodically dependent on the circumferential angle, e.g., sinusoidally dependent. The second cam disk region is formed in one piece, i.e., in one part, with the housing part 2.

The second cam disk region has a discrete rotational symmetry, e.g., the count of which is equal to the number of complete periods of the second cam disk region formed in the circumferential direction.

The associated axis of symmetry of the rotational symmetry of the second cam disk region is identical to the axis of rotation of the hollow shaft 1.

The second cam disk region is arranged axially next to the first cam disk region.

As illustrated in FIGS. 1 to 6, the second cam disk region is arranged in the same manner as the first cam disk region, i.e., it is not offset in the circumferential direction. The sinusoidal dependence of the inner radius of the second cam disk region on the circumferential angle is thus identical to the sinusoidal dependence of the inner radius of the first cam disk region on the circumferential angle.

For example, the second cam disk region is offset in the circumferential direction by half a period length relative to the first cam disk region. For example, the offset is thus 180°/M, where M is the number of periods of the cam disk region in the circumferential direction. Alternatively, an offset of 180° is also possible, in which, for example, the offset of the eccentric regions to each other may but need not be omitted. For example, further rows of rollers are provided axially spaced from the first and second, which then also roll or slide on the cam disk region, in which the associated eccentric regions are offset by 360°/N, in which N is the number of roller rows.

As illustrated in FIGS. 1 to 6, the second cam disk region is configured in the same manner as the first cam disk region and the entire cam disk region can thus be manufactured readily and cost-effectively.

The number of periods and also the eccentricity provide for a high transmission ratio with high torque.

As illustrated in FIGS. 1 to 6, the cage 4 surrounds the shaft 1. For this purpose, the smallest radial distance of the cage 4 at each axial position is thus greater than the largest radial distance of the shaft 1 in the axial region covered by the cage 4.

At each axial position, the radial distance region covered by the cage 4 is arranged radially spaced from the radial distance region covered by the shaft 1 and/or radially spaced and/or further out.

The axial direction is aligned parallel to the axis of rotation of the shaft 1. The mentioned radial distances are thus always related to the axial axis. The circumferential direction and the circumferential angle are also related to this axial direction.

The cage 4 is designed in one piece, i.e., in one part, with the output shaft 10.

Thus, the cage 4 is formed in a first axial region of this part and the output shaft 10 is formed axially adjacent to the cage 4 on the output side, which output shaft 10 has axial bores on its axial end face, which are arranged as threaded bores. This means that a device to be driven with its rotatably mounted element can be screw-connected to the shaft 1.

The output shaft 10 can also be referred to as an outputting shaft.

The output shaft 10 is mounted towards the shaft 1 by a further bearing 16 and rotatably mounted towards the housing, e.g., towards a second housing part 17 connected to the first housing part 2, by two bearings (14), which are, for example, arranged as angular contact bearings.

In this manner, the cage 4 together with the output shaft 10 is made to rotate as smoothly as possible.

To reduce imbalance and further improve smooth running, the first and second eccentric regions 8 and 9 are arranged identically but offset by 180° to each other in the circumferential direction. If additional eccentric regions and correspondingly assigned roller rows are used, a circumferential offset of 360°/N between two adjacent roller rows is possible, in which the number of roller rows is equal to the number of eccentric regions.

Furthermore, a shaft seal ring 15 is provided towards the shaft 1, e.g., radially inwards, and a further shaft seal ring 18 is provided towards the housing, e.g., radially outwards towards the housing.

The shaft seal ring 15 is accommodated by the output shaft 10 and its sealing lip runs on a finely machined region of the shaft 1.

The shaft seal ring 18 is accommodated in the second housing part 17 and its sealing lip runs on the output shaft 10 or on a ring fitted on the output shaft 10.

The bearings of the bearing arrangement 14, which are, for example, arranged as angular contact bearings, are accommodated with their outer ring in the second housing part 17 and are fitted with their inner ring onto the output shaft 10.

The inner ring of the additional bearing 16, e.g., the roller bearing, e.g., the ball bearing, is fitted onto the shaft 1. The outer ring of the additional bearing 16 is accommodated in the output shaft 10.

The inner ring of the first bearing 5 is fitted onto the first eccentric region 8.

The inner ring of the second bearing 7 is fitted onto the second eccentric region 9.

The outer ring of the first bearing 5 or a ring part fitted onto this outer ring acts as a rolling surface for the first rollers 3.

The outer ring of the second bearing 7 or a ring part fitted onto this outer ring acts as a rolling surface for the second rollers 6.

A third housing part 19 at least partially surrounds the spur gear stage formed by the first and second gears (12, 13). The third housing part 19 is connected to the housing of the electric motor driving the first gear 12.

The first housing part 2 and the second housing part 10 are arranged on the side of the third housing part 19 facing away from the electric motor 11. The first housing part 2 is arranged between the second housing part 10 and the third housing part 19. The first, second, and third housing parts (19, 2, 10) are connected by connecting screws 20 passing through these three housing parts (19, 2, 10).

Figure 4:
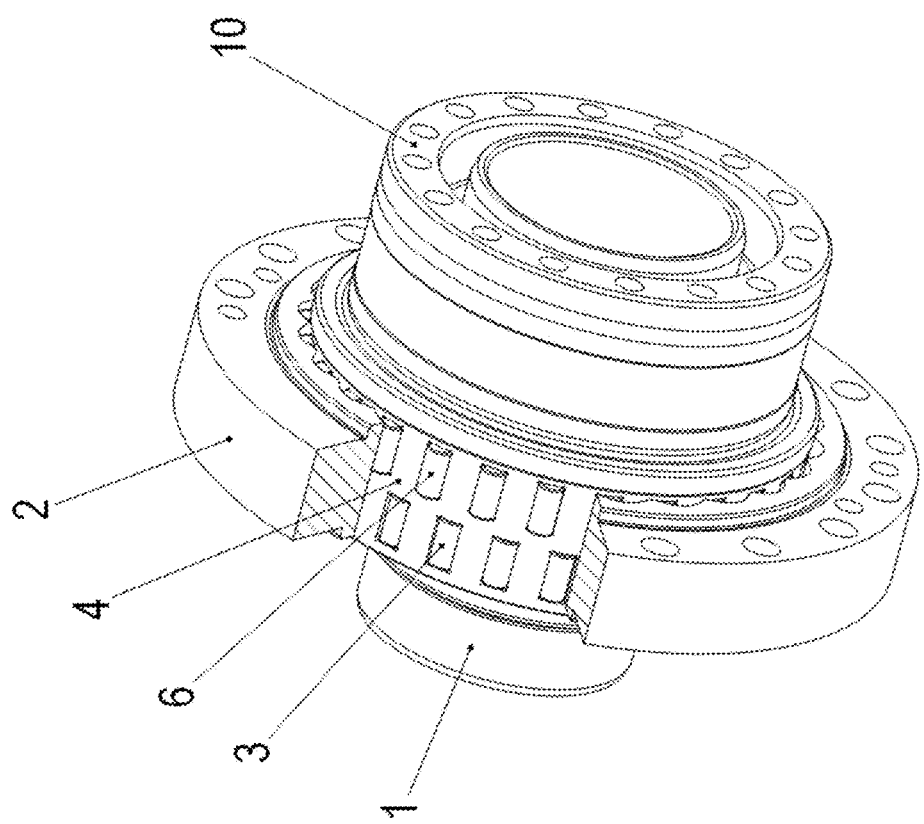
FIG. 4 illustrates a cage 4 in which first rollers 3 and second rollers 6 are accommodated and roll and/or slide on the first housing part 2.
Figure 5:
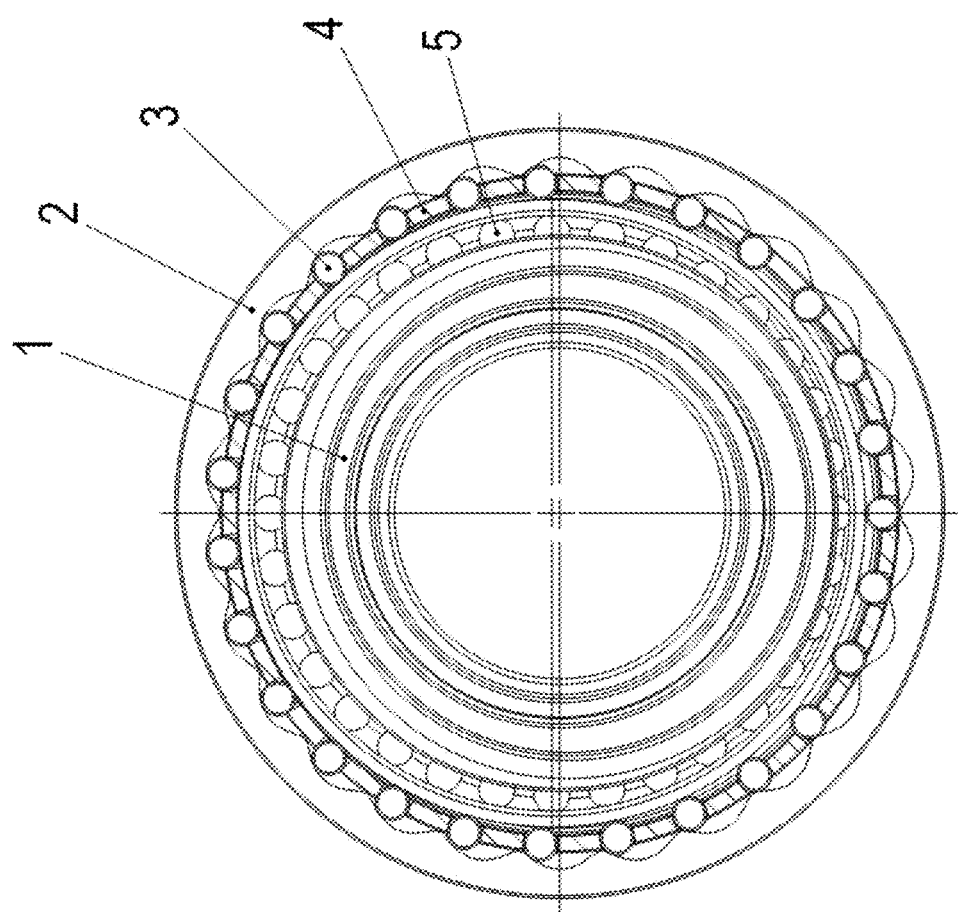
FIG. 5 is a cross-sectional view of the first housing part 2, in which only the row formed by the first rollers 3 is illustrated.
Figure 6:
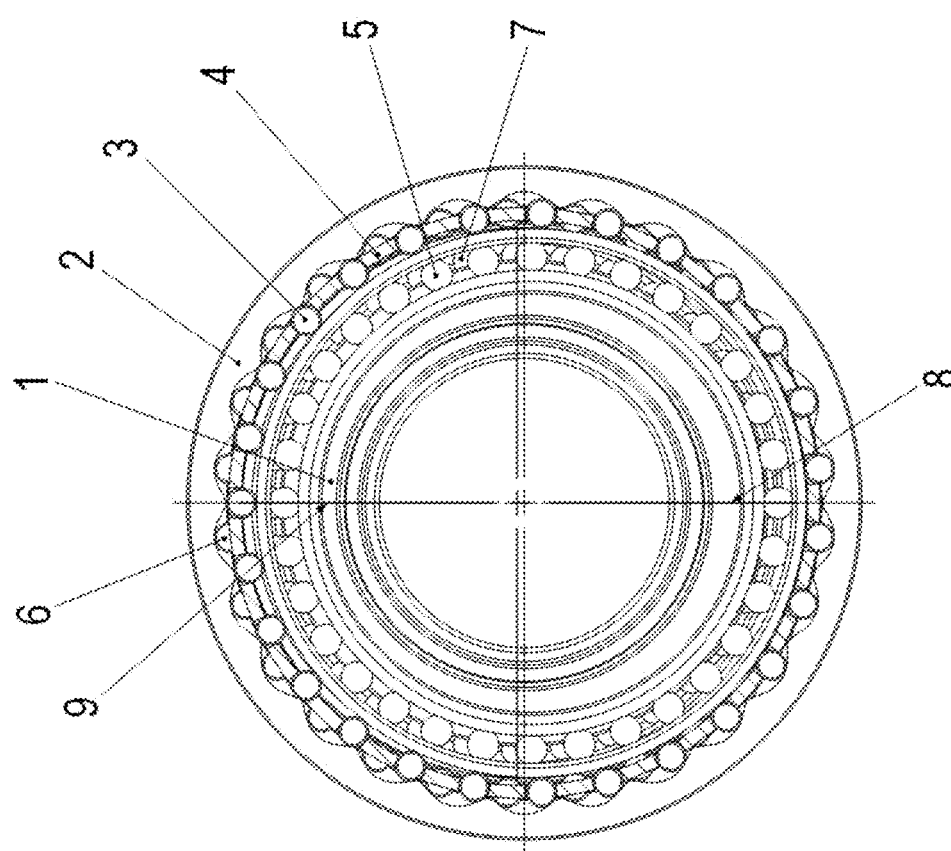
FIG. 6 is a cross-sectional view of the first housing part 2, in which the row formed by the first rollers 3 and the row formed by the second rollers 4 are illustrated.
Figure 7:
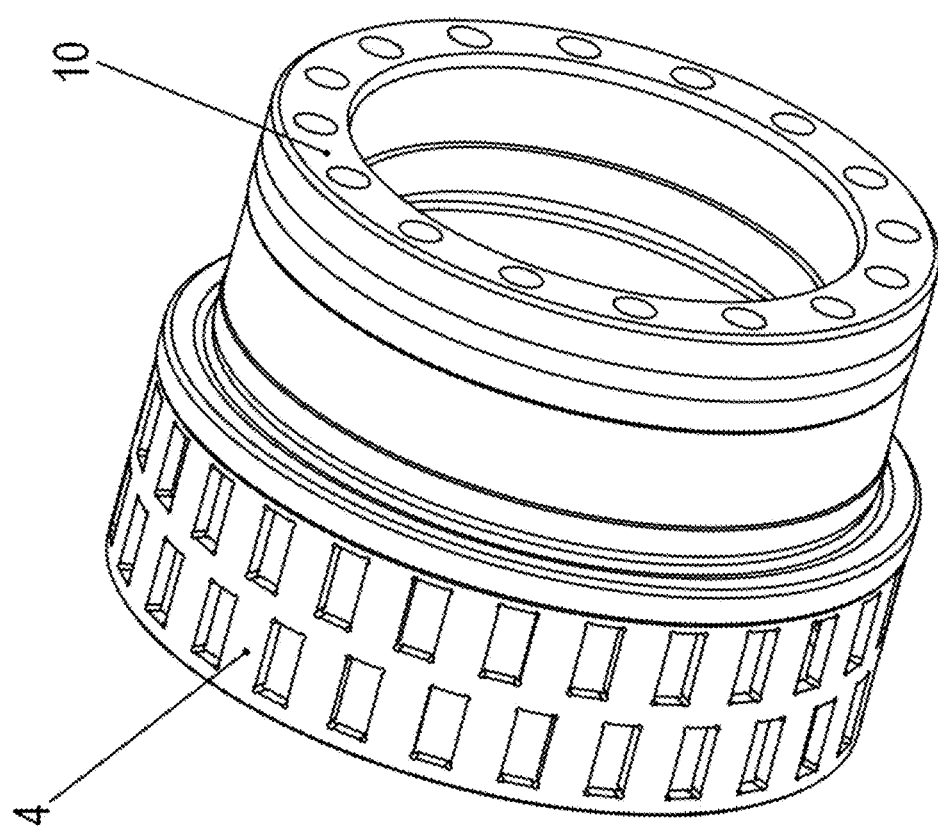
FIG. 7 is a perspective view of the cage 4.

As illustrated in FIGS. 1 to 7, e.g., in FIGS. 4 and 7, the first rollers 3 and also the recesses of the cage 4 accommodating the first rollers 3 form a first row in the circumferential direction.

Similarly, the second rollers 6 and also the recesses of the cage 4 accommodating the second rollers 6 form a second row in the circumferential direction.

The first rollers 3 are regularly spaced from one another in the circumferential direction, e.g., evenly spaced. Similarly, the second rollers 6 are spaced from one another in the circumferential direction, e.g., evenly spaced.

The rollers (3, 6) of each roller row are all located on a circle or the axes of the rollers (3, 6) are located on an imaginary cylinder. The center of this circle respectively lies on the axis of the associated eccentric region or the axis of this respective cylinder is concentric with the associated eccentric region. Accordingly, the cylinder axes are arranged parallel but radially offset to each other. The first roller 3 is in contact with the first eccentric region 8 and the second rollers 6 are in contact with the second eccentric region 9. The two rows are thus not coaxially aligned with each other. In addition, the cylinder containing the axes of rotational symmetry of the first rollers 3 is axially spaced from the cylinder containing the axes of rotational symmetry of the second rollers 6.

In the circumferential direction, however, the first row is offset from the second row by half a period length of the first rollers 3 within the first row.

Each second roller 6 thus has an offset angle of 180°/N to a respective first roller 3, where N is the number of first rollers 3 arranged in the first row.

In this manner, a lower torque ripple is achieved.

For example, further rows with further rollers and associated cam disk arrangements are provided.

Figure 8:
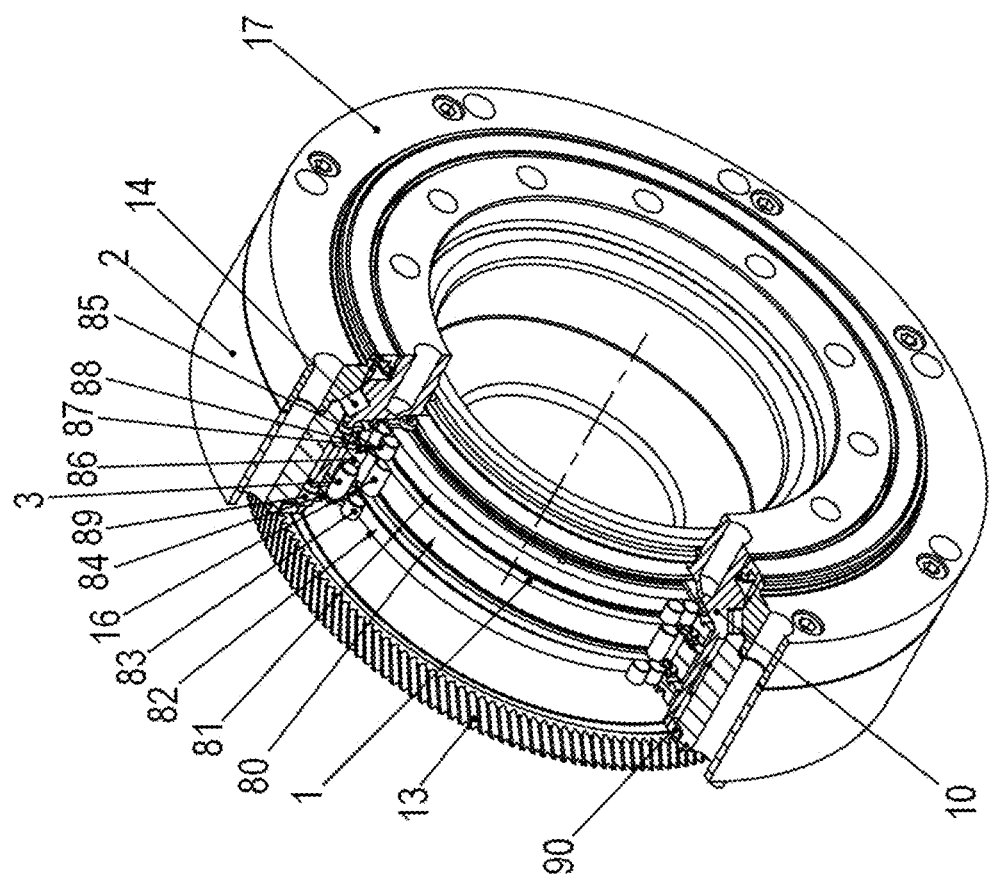
FIG. 8 is a perspective view of a further drive, in which three rows of rollers are provided, which are partially removed.
Figure 9:
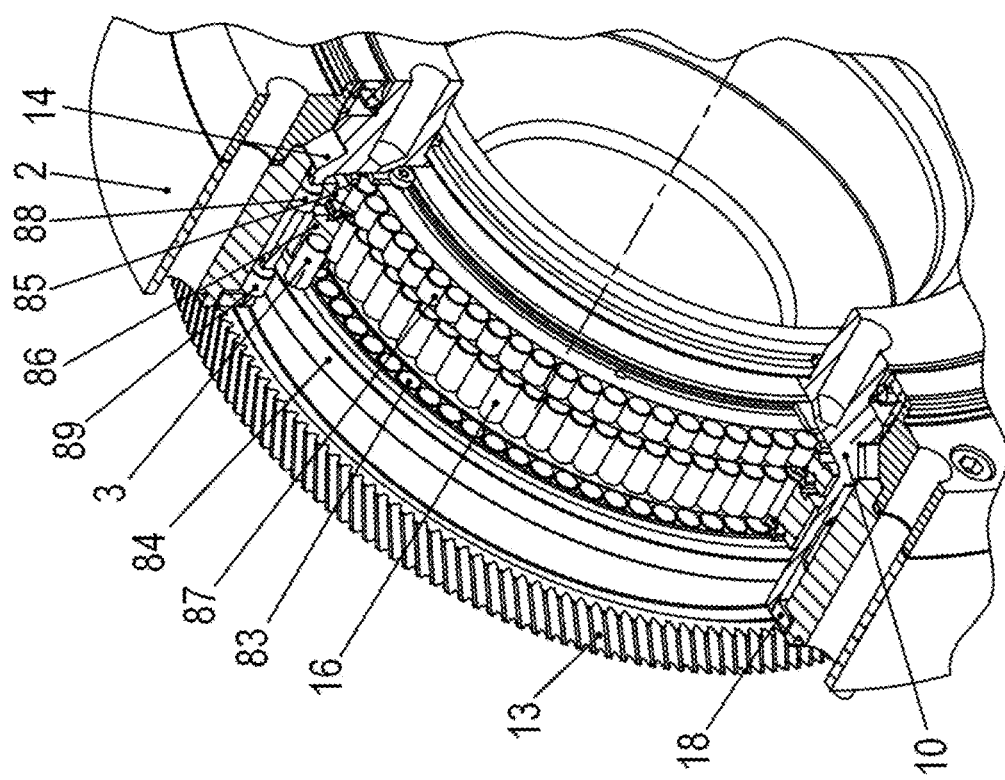
FIG. 9 illustrates the rolling elements of the eccentric bearings in place.
Figure 10:
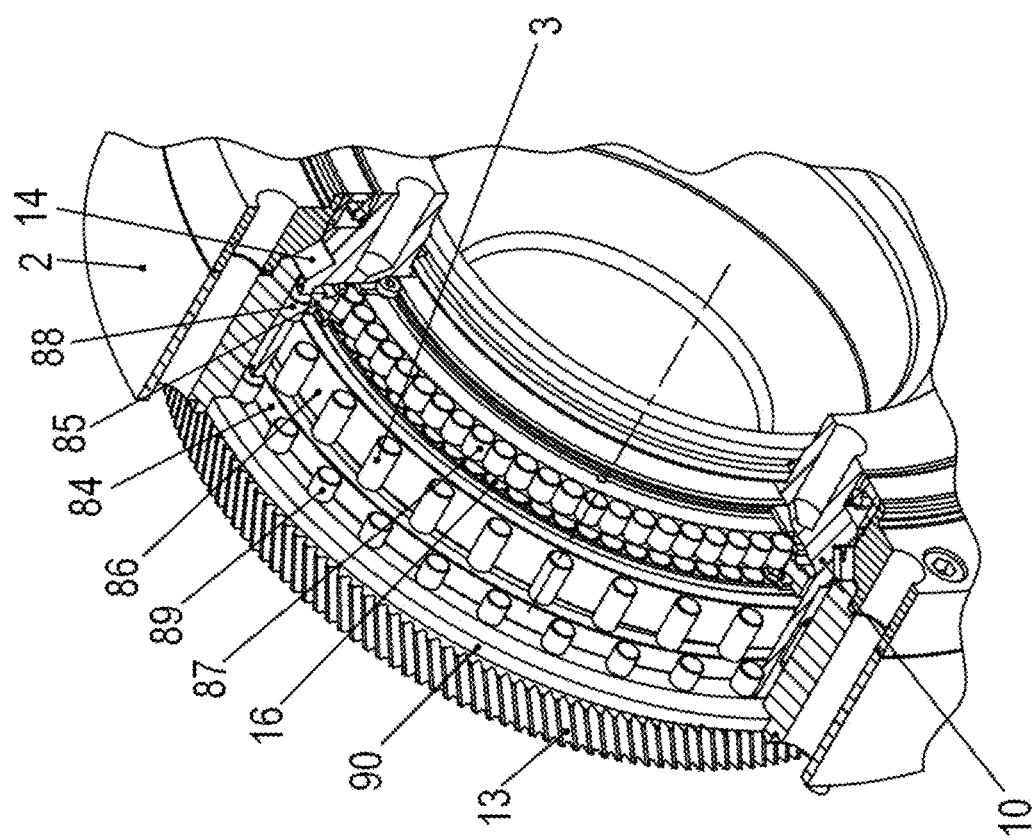
FIG. 10 illustrates the rollers 3 of the drive, with the cage connected to the output shaft 10 removed.
The cage is illustrated in FIG. 11, in contrast to FIG. 10.
Figure 11:
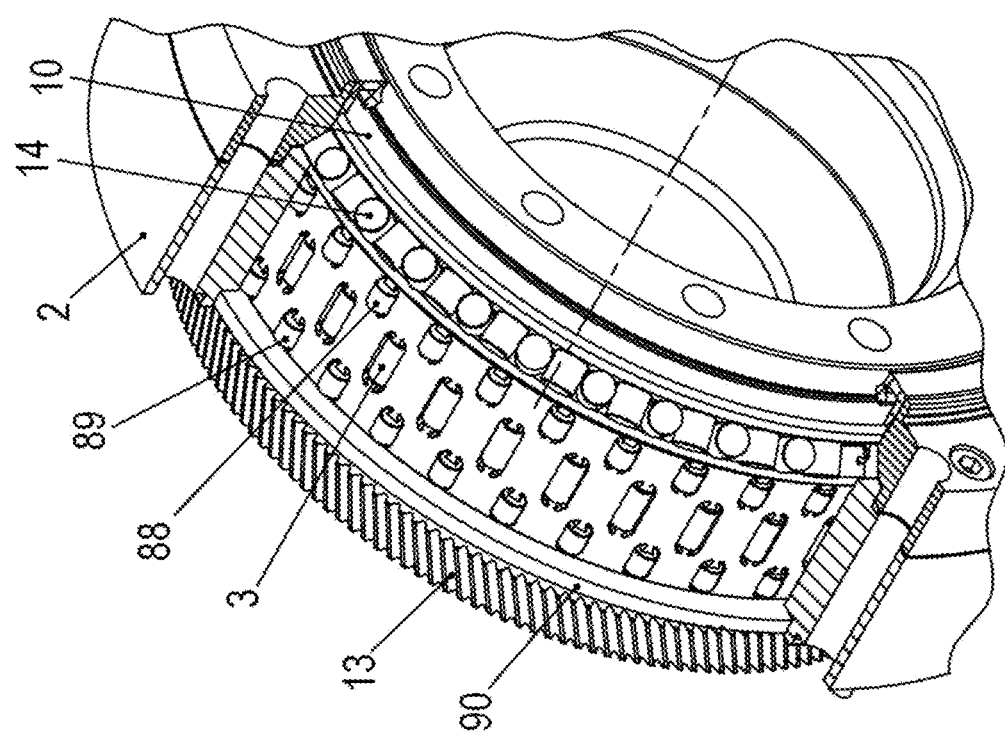
Figure 12:
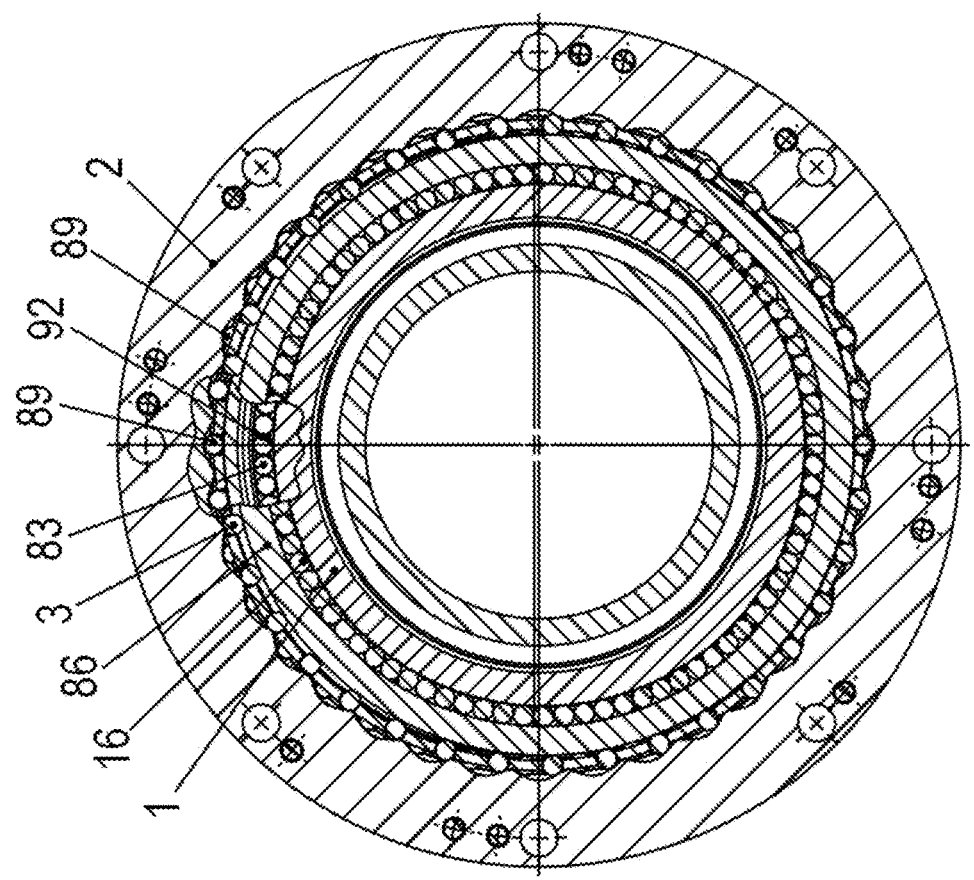
FIG. 12 is a cross-sectional view of the drive.

FIG. 8 illustrates an example of another drive in which three rows of rollers are provided.

As illustrated in FIG. 8, the input hollow shaft 1 has a first eccentric region 80, which is arranged axially between a second and a third eccentric region (81, 82).

The high point of the first eccentric region 80 is offset by 180° in the circumferential direction to the high points of the second and third eccentric regions (81, 82), which high points are respectively arranged at the same circumferential position.

In the axial direction, the first eccentric region 80 is wider than the second eccentric region 81.

In the axial direction, the first eccentric region 80 is wider than the third eccentric region 82.

For example, the sum of the axial widths of the second and third eccentric regions (81, 82) is equal to the axial width of the first eccentric region 80.

Thus, a particularly well-balanced configuration is achieved.

A rolling bearing is respectively slid onto each of the eccentric regions (80, 81, 82), which are referred to below as eccentric bearings.

A first eccentric bearing, whose rolling bodies 16 are arranged as a cylindrical roller or barrel, is pushed onto the first eccentric region. The rolling bodies (83, 87) of the second and third eccentric bearing are also arranged as cylindrical rollers or barrels.

The output shaft 10 has a flange block interface on the output side, i.e., an interface that is suitable for robot applications. Axial bores, which are configured as threaded bores and are spaced apart from one another in the circumferential direction, are available on the output shaft 10.

At its end region axially facing away from the flange block interface, the output shaft 10 has a tubular region that is configured as a cage and radially surrounds the eccentric bearings (80, 81, 82).

The respective rollers (16, 88, 89) are accommodated in recesses (141, 142, 143) of the cage and are arranged so as to be movable in a radial direction relative to the cage. Thus, the range of movement of the rollers (16, 88, 89) is delimited radially inwards by the respective outer ring of the respective eccentric bearing and radially outwards by a respective cam disk contour, which is formed on the inside of the first housing part 2. The first of the cam disk contours is in turn offset by 180° in the circumferential direction to the other two cam disk contours, which run in the same manner to each other, i.e., without offset.

The first rollers 16 thus roll on the first cam disk contour and the second rollers 88 roll on the second cam disk contour.

The third rollers 89 roll on the third cam disk contour.

In the axial direction, the first cam disk contour is arranged between the second and third cam disk contour.

A second housing part 17 is connected to the first housing part 2 and surrounds the flange block interface of the output shaft 10.

The second and third rollers (88, 89), which differ in width from the first roller 16, are thus arranged such that the dynamic imbalance is minimized or eliminated.

Cylindrical or barrel-shaped rolling bodies 14 are provided for mounting the output shaft 10 along with the cage, the cylindrical axis of which rolling bodies 14 intersects with the axis of rotation of the output shaft 10, e.g., having an angle of between 10° and 80° to the axis of rotation of the output shaft 10.

The running surface of the rolling body 14 is formed on the second housing part 17 on the one hand and on the output shaft 10 on the other.

For example, thus, the output shaft 10 forms an inner ring and the second housing part forms the outer ring of the bearing arrangement of the output shaft 10.

In addition, the first housing part 2 delimits the rolling body 14, e.g., in the direction of the cylindrical axis of the rolling body 14.

The rolling body 14 is thus delimited by the first housing part 2, the second housing part 17 and the output shaft 10.

To accommodate the rolling body 14, the output shaft 10 has a V-shaped annular groove, e.g., the annular axis of which is aligned coaxially with the axis of rotation of the output shaft 10.

By the rolling body 14, the V-shaped annular groove of the output shaft 10 and the V-shaped recess, the walls of which are formed by the first housing part 2 and the second housing part 17, the bearing of the output shaft corresponds to a crossed roller or four-point bearing arrangement. Both radial and axial forces are absorbed by the bearing arrangement. For example, the bearing arrangement also absorbs moments directed in this manner.

Figure 18:
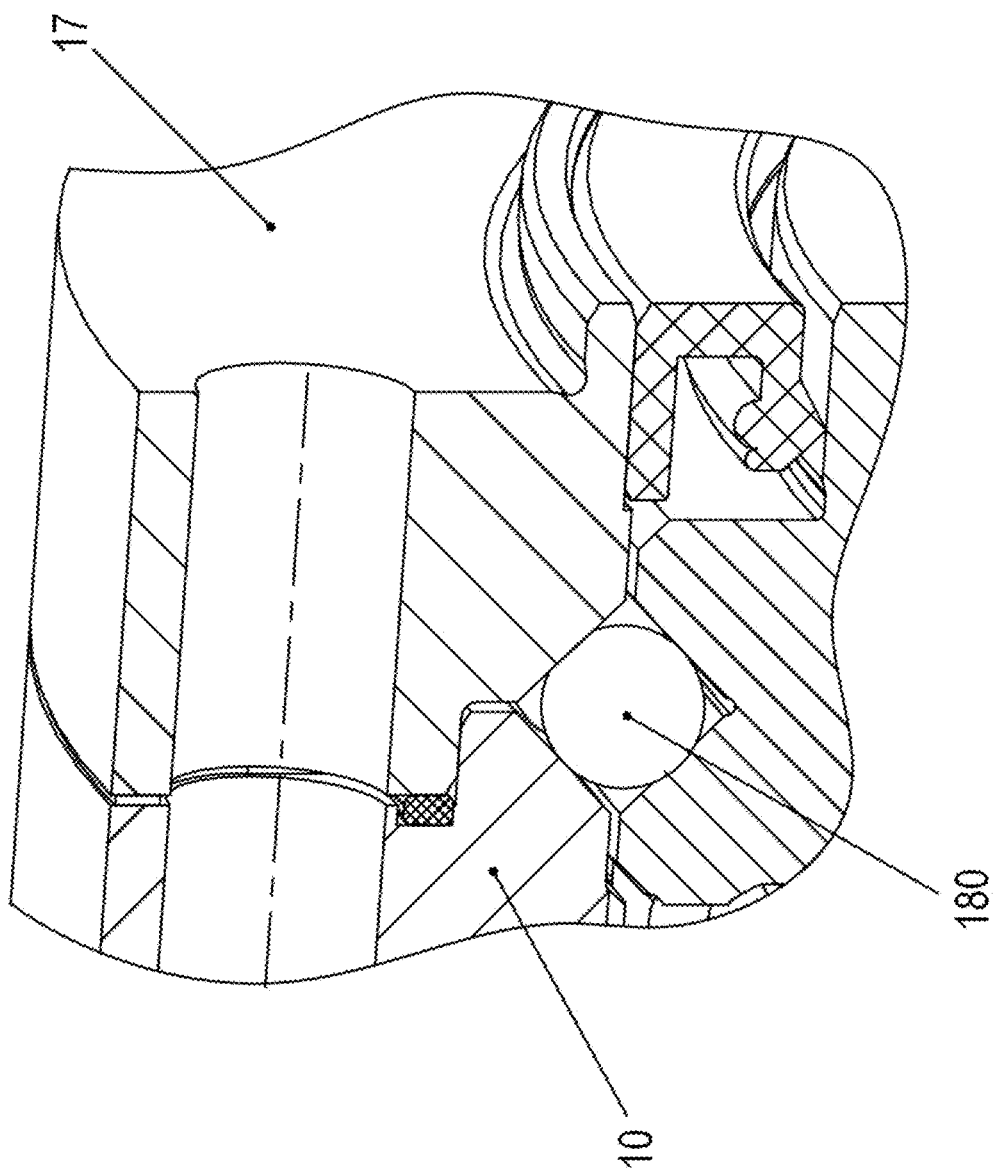
FIG. 18 is a cross-sectional view of the bearing arrangement of the output shaft 10 in more detail, in which a ball 180 is used as a rolling body instead of a cylinder or a barrel.
Figure 19:
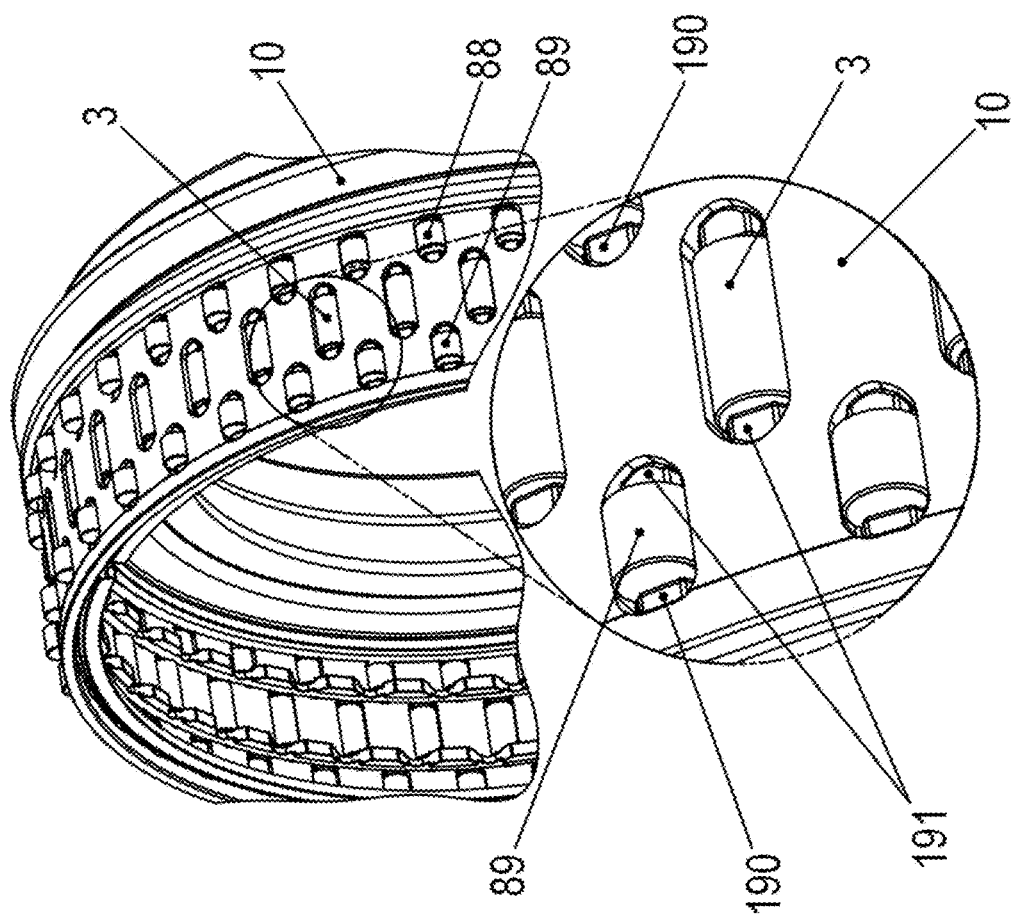
FIG. 19 illustrates an alternative cage 10, in which the recesses are arranged without notches and spacer rings (190, 191) clamp into the recesses of the cage 10 with their nubs projecting radially outwards.
The cage 10 is hidden in FIG. 20, in contrast to FIG. 19.
Figure 20:
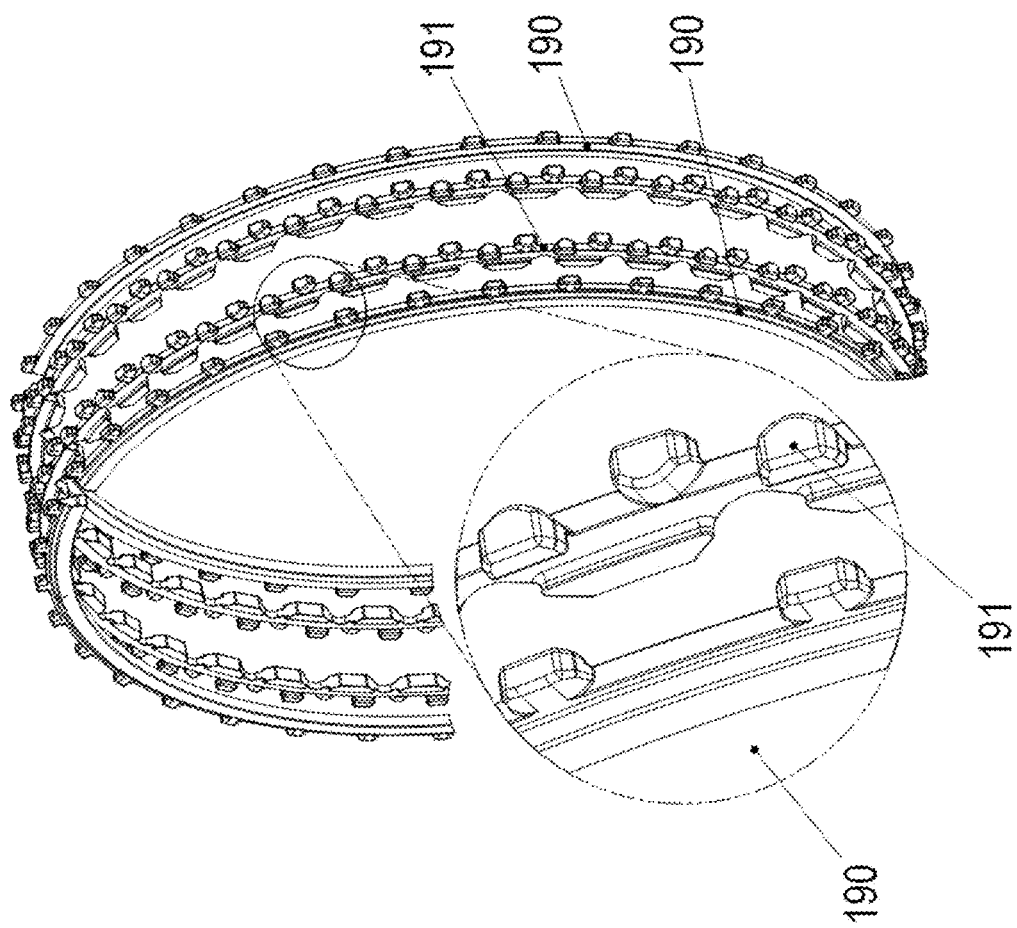
Figure 21:
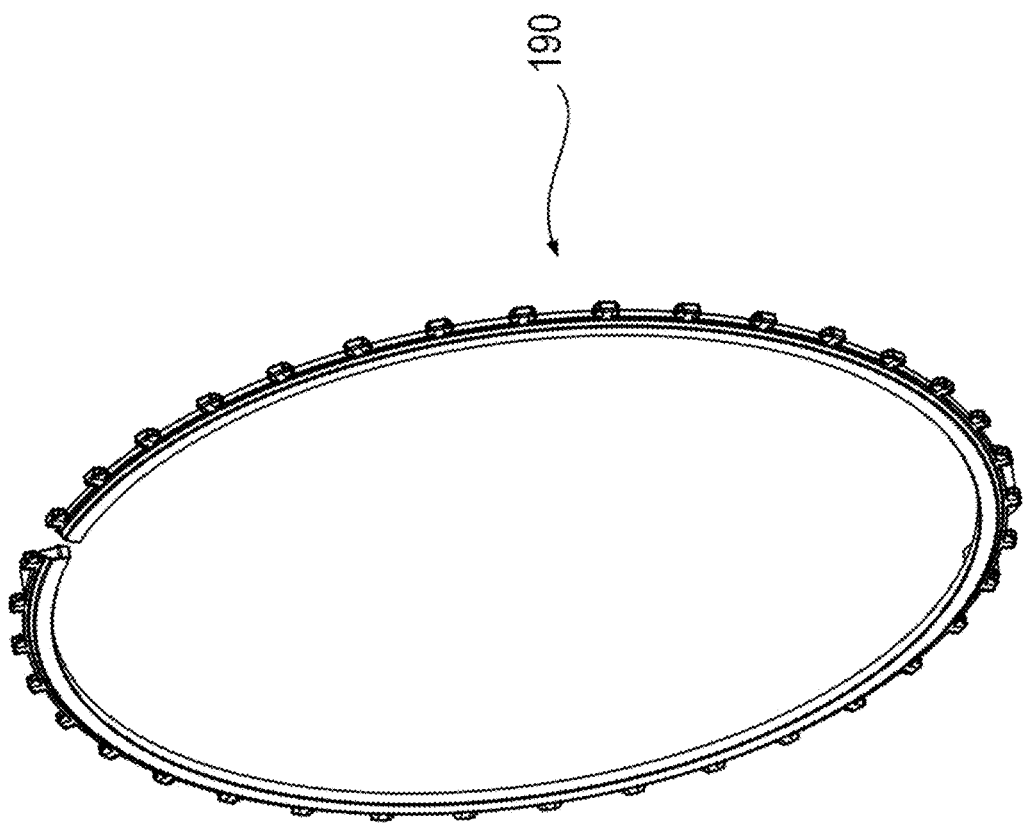
FIG. 21 illustrates a third spacer ring 190.
Figure 22:
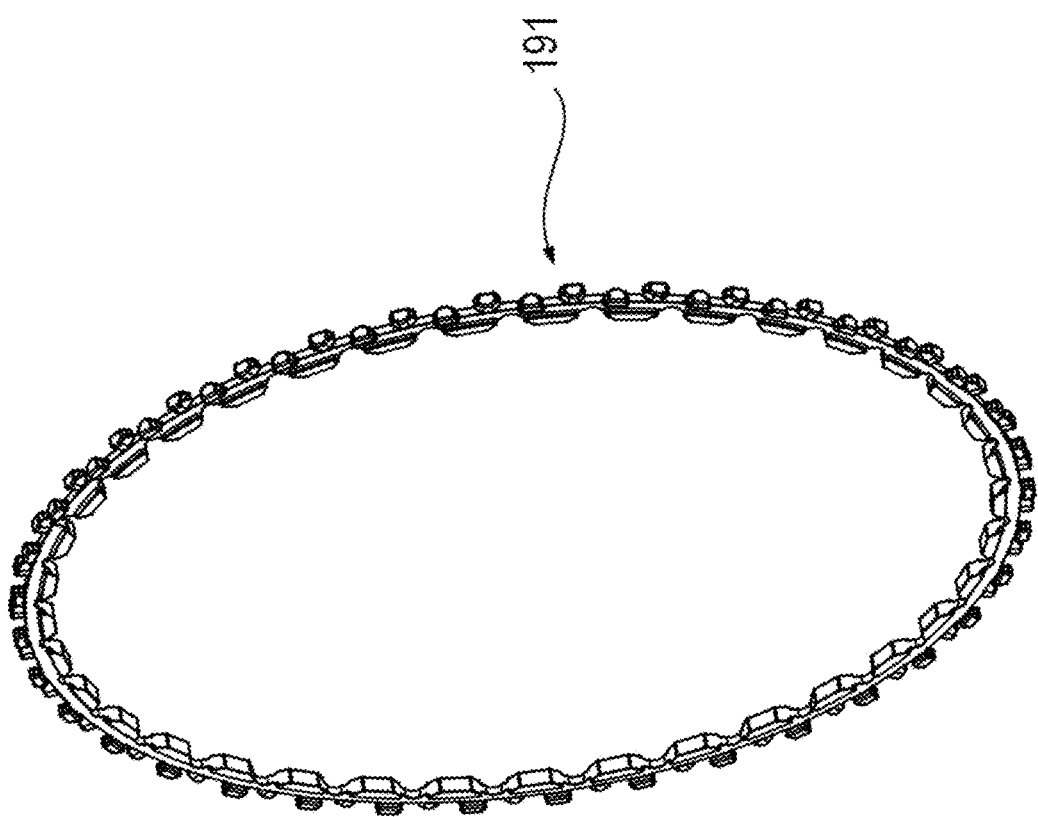
FIG. 22 illustrates a first spacer ring 190.

As illustrated in FIG. 18, a rolling body 180 arranged as a ball can be used instead of the cylindrical or barrel-shaped rolling body 14.

Figure 13:
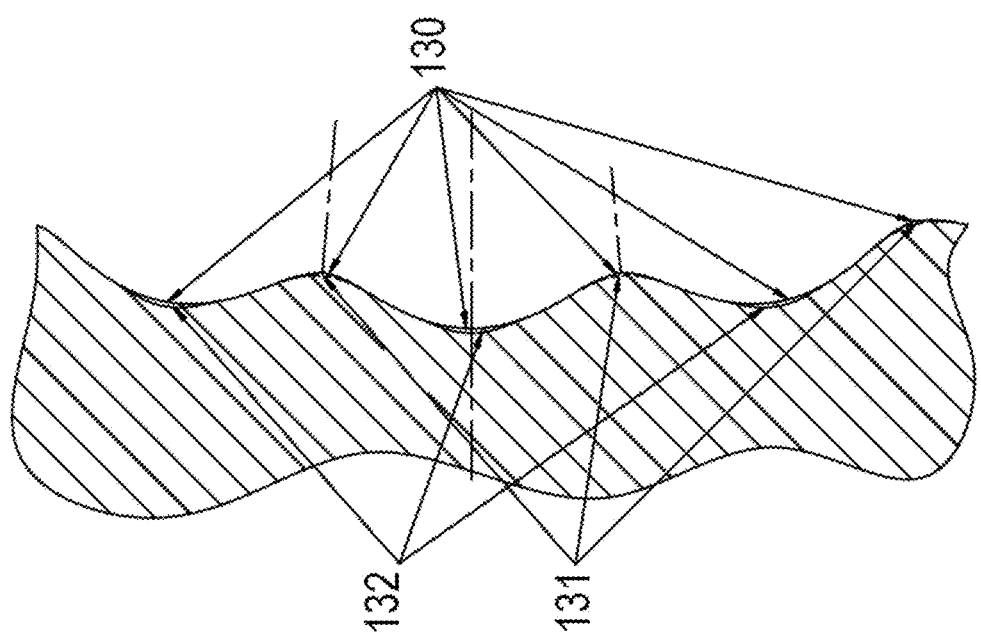
FIG. 13 illustrates a tip relief and root relief for the contour of a cam disk of the drive.
Figure 14:
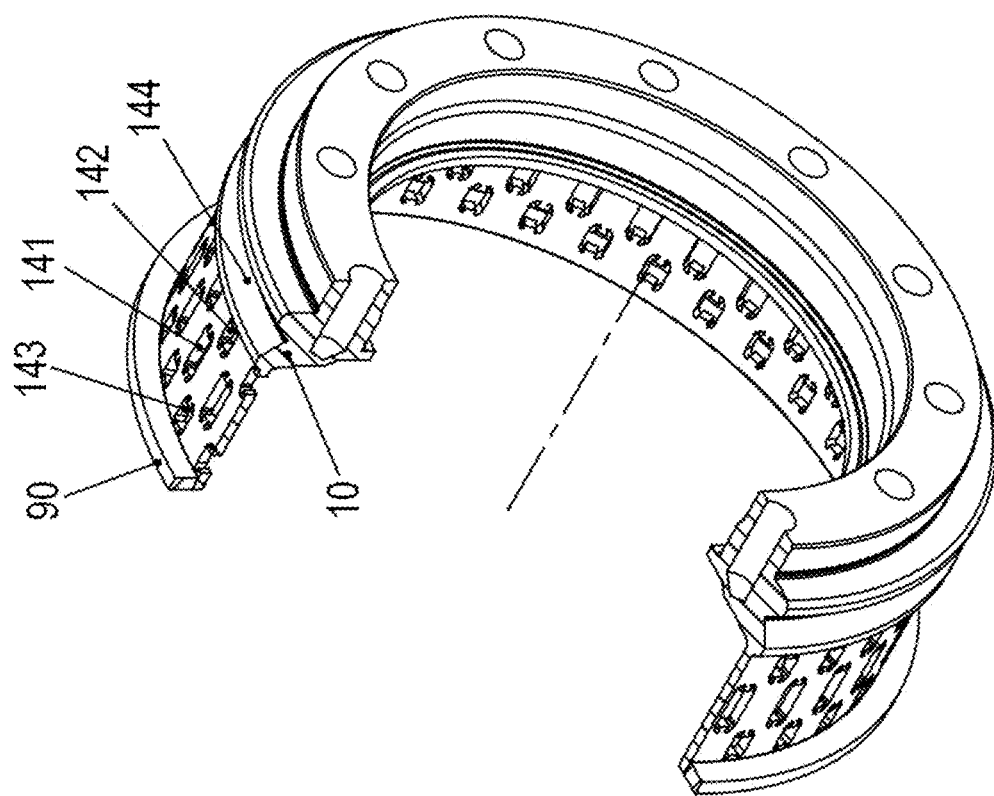
FIG. 14 illustrates the output shaft 10 of the example illustrated in FIG. 8.

As illustrated in FIG. 13, the respective cam disk contour has a tip relief 131 at the radially inwardly projecting tip regions of a nominal curve 130, e.g., a nominal contour, of the cam disk and a root relief 132 at the root regions of this nominal curve 130. For example, the root regions are the regions of the nominal curve 130 that are radially furthest away from the axis of rotation of the output shaft 10.

The input shaft 1 is oriented coaxially to the output shaft 10.

The output shaft 10, e.g., its cage, has a circumferentially continuous stiffening ring 90 at its axial end region facing away from the flange block interface. For example, the stiffening ring 90 projects radially outwards on the cage.

In this manner, the thin-walled cage is reinforced and achieves a higher load capacity and load-bearing capacity. The radial wall thickness of the cage is smaller than the radial wall thickness in the remaining region of the output shaft 10, e.g., in the axial region which is covered by the rolling bodies 14.

The cage has three rows of recesses (141, 142, 143) corresponding to the rows of rollers.

In the circumferential direction, the recesses (141, 142, 143) of the respective row are evenly spaced from one another and in the same axial position.

The first row of recesses 141 is arranged axially between the second row of recesses 142 and the third row of recesses 143. For example, the row of second recesses 142 is offset relative to the row of first recesses 141 in the circumferential direction. The row of second recesses 142 is not offset relative to the row of third recesses 141 in the circumferential direction.

Figure 15:
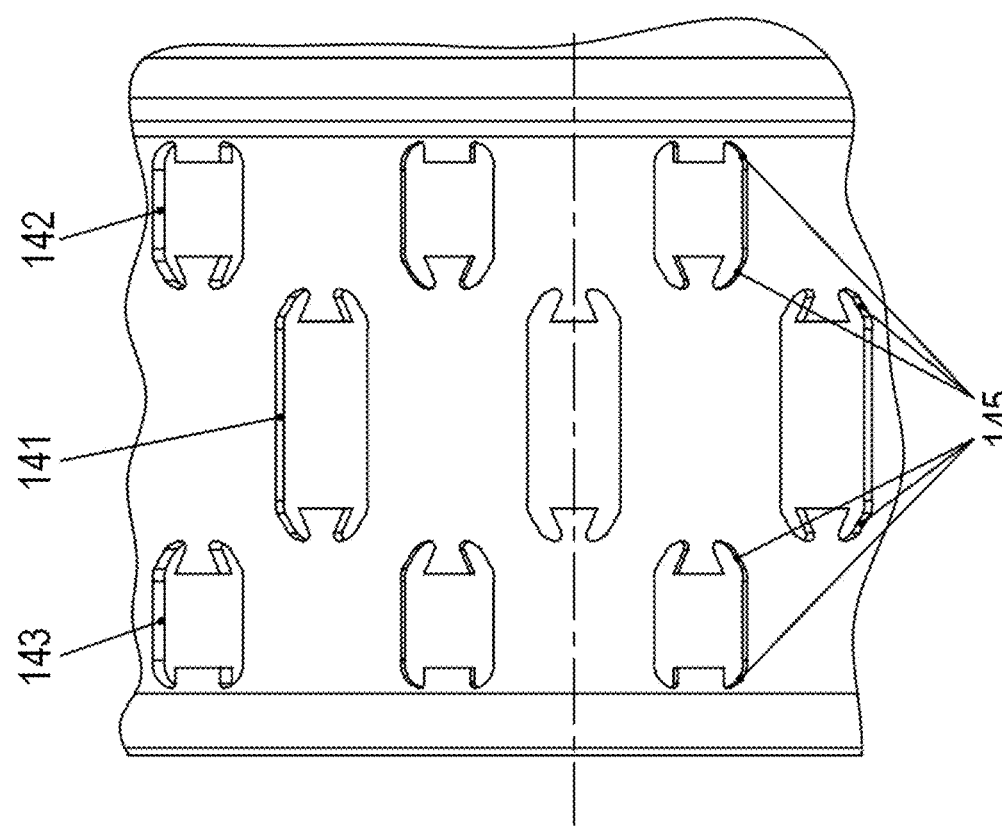
FIG. 15 is a top view of a region of the cage.
Figure 16:
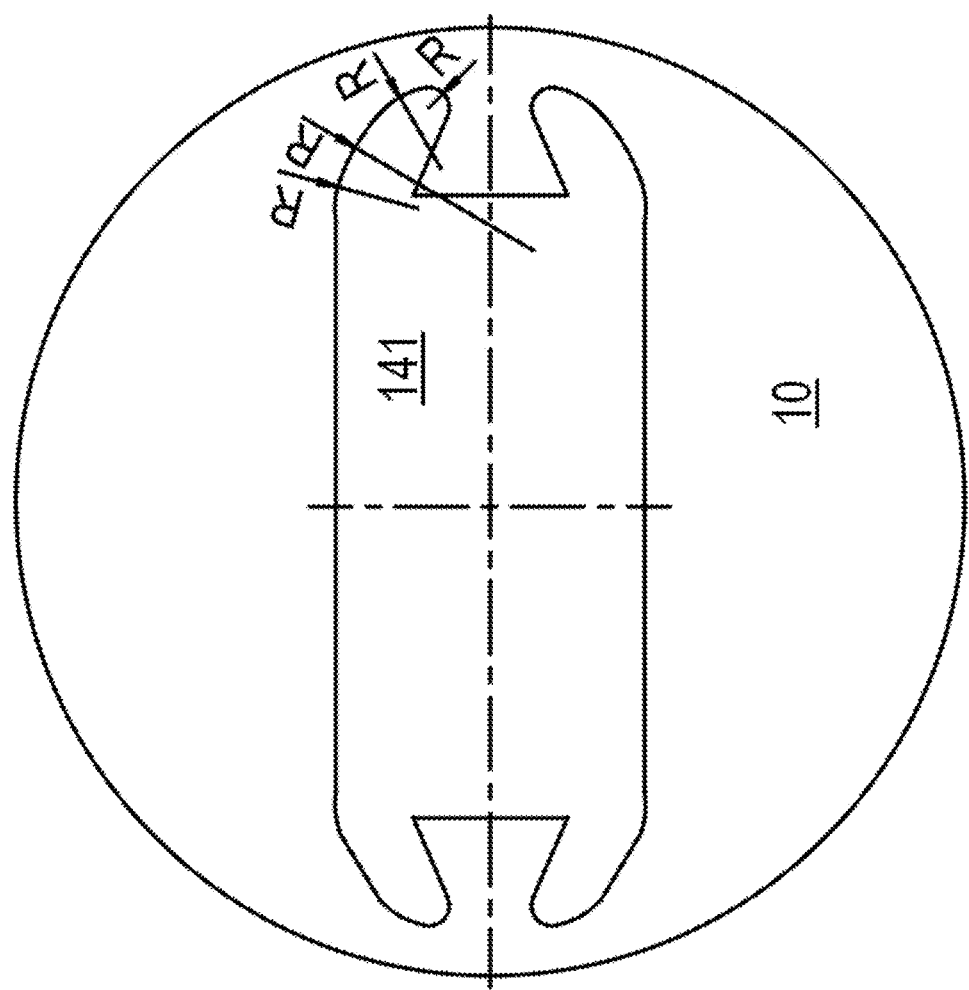
FIG. 16 is an enlarged view of a recess of the cage.
Figure 17:
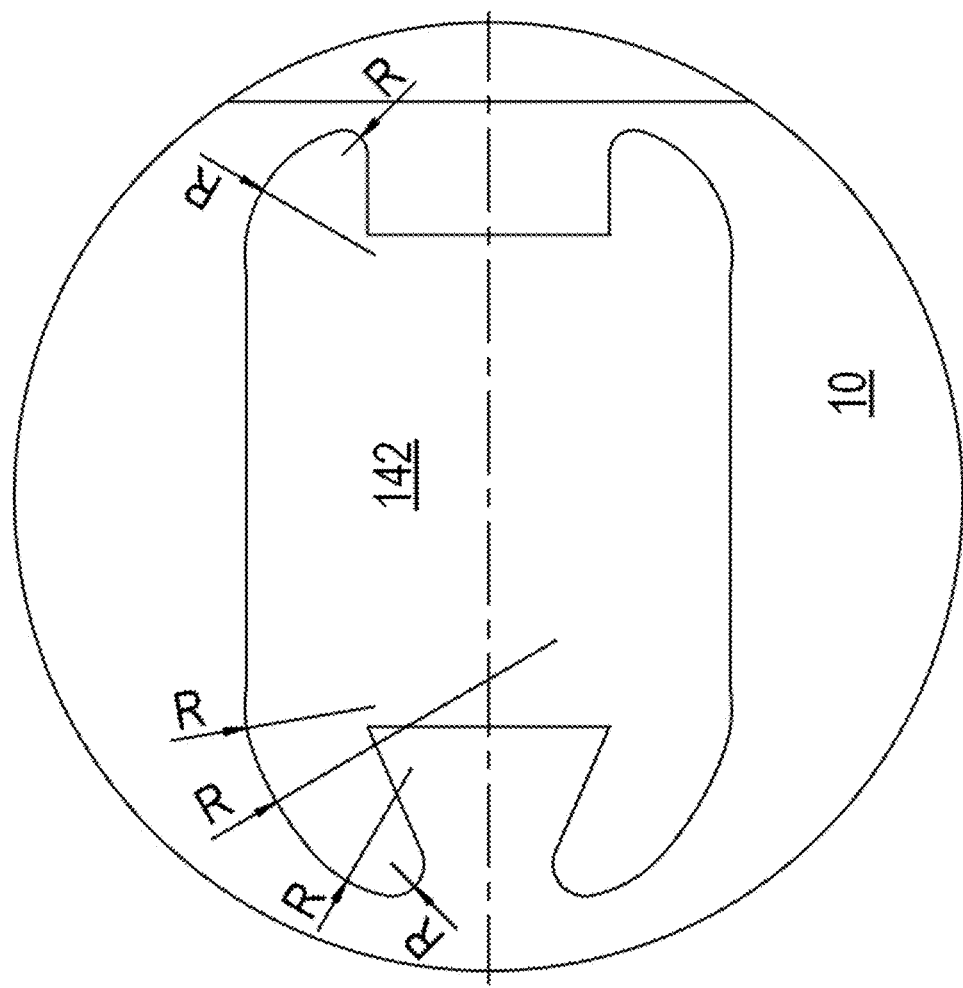
FIG. 17 is an enlarged view of another recess of the cage.

As illustrated in FIGS. 15 to 17, the recesses (141, 142, 143) have relief notches at their four corner regions, for example. The edges of the first recesses 141, which edges are arranged axially on both sides, are thus dovetail-shaped.

Respectively two of the relief notches are curved. For example, the relief notches of each such pair are curved such that they are directed towards each other.

Each first recess 141 has a rectangular region, the corner regions of which are adjoined by relief notches which on the one hand, i.e., on a first side of the rectangular region, project in the axial direction, in which the distance between the two relief notches on the first side decreases monotonically, e.g., strictly monotonically, as the axial position increases, e.g., more and more in the axial direction, and, on the other hand, i.e., on the other side of the rectangular region, project against the axial direction, in which the distance between the two relief notches on this other side decreases monotonically, e.g., strictly monotonically, as the axial position decreases, e.g., more and more against the axial direction.

The curved shape is, for example, composed of radii R.

The first rollers 3 are delimited in the axial direction by the respective first and the respective other side of the rectangular region.

In contrast to the first recesses 141, the second recesses 142 only have a single pair of relief notches facing each other. The other respective pair, which on the side of the second recesses 142 facing away from the first recesses, has relief notches aligned substantially parallel to each other.

As illustrated in FIGS. 19 to 22, the cage can also be arranged with rounded rectangular slot-shaped recesses. The axial delimitation of the first rollers 3 is achieved by a first spacer ring 191, the radially projecting nubs of which project into respective first fillets of the rectangular slot-shaped recesses and thus axially delimit the respective roller 3, in which a further spacer ring projects with its nubs into the respective other fillet.

The nub of the spacer ring that is closest to a nub of the first spacer ring projecting into the fillet of the first recess projects into the fillet of a respective third recess to delimit a respective third roller 89.

The nub of the further spacer ring that is closest to a nub of the further spacer ring projecting into the second fillet of the first recess projects into the fillet of a respective second recess to delimit a respective second roller 88.

A second spacer ring 190 respectively projects with its radially projecting nubs into a fillet of the respective second recess and axially delimits the respective second roller 88.

A third spacer ring 190 respectively projects with its radially projecting nubs into a fillet of the respective third recess of the cage and axially delimits the respective third roller 89.

As illustrated in FIGS. 19 to 22, four spacer rings are thus required for three rows of rollers, each of which spacer rings is, for example, manufactured as a plastic injection-molded part. The nubs of the respective spacer ring (190, 191) are regularly spaced from one another in the circumferential direction.

The nubs are flat on the side axially delimiting the respective roller and rounded in accordance with the fillet on the side facing away from the roller axially delimited by the nub. In this manner, the end face of the respective cylindrical or barrel-shaped roller touches the flat region of the respective nub.

For example, the rollers (16, 88, 89) have different widths in the axial direction and are arranged behind one another such that the dynamic imbalance is reduced or eliminated.

When using N rows of rollers, the widths $C\_i$ of the rollers are selected such that the sum of the products of the respective width $C\_i$ and the cosine value of the circumferential position of the high point assigned to the respective eccentric region is eliminated, as is the sum of the products of the respective width $C\_i$ and the sine value of the circumferential position of the high point assigned to the respective eccentric region.

It is permissible, for example, for two of the roller rows to have the same width and for the eccentric regions assigned to the two roller rows to have the identical circumferential angle position of their high points. A high point of a further eccentric region, which is assigned to a third row of rollers, may have a different position to this.

The rollers of roller rows whose associated eccentric region has the same circumferential angle position of its high point have the same axial width in total as the sum of the axial width of other rollers of other roller rows whose associated eccentric region has a different circumferential angle position of its high point in common.

In the circumferential direction, the high points of the eccentric regions are arranged such that the radial forces resulting from the rolling contacts of the rollers during operation cancel each other out.

In the axial direction, the high points of the eccentric regions are arranged such that the moments of the radial forces resulting from the rolling contacts of the rollers during operation cancel each other out.

In the configuration illustrated in FIG. 8, the rollers of the different roller rows are of unequal width in the axial direction, e.g., have different widths. The axial width of the first, i.e., middle, roller is equal to the sum of the axial widths of the rollers in the other two roller rows.

The high points of the axially outer eccentric regions are arranged at the same circumferential angle position.

LIST OF REFERENCE NUMERALS

1 Hollow shaft with eccentric regions
2 First housing part
3 First roller
4 Cage for first rollers 1 and second rollers 6
5 First bearing, e.g., rolling bearing, e.g., ball bearing
6 Second roller
7 Second bearing, e.g., rolling bearing, e.g., ball bearing
8 First eccentric region of the hollow shaft 1
9 Second eccentric region of the hollow shaft 1
10 Output shaft
11 Electric motor
12 First gear
13 Second gear
14 Bearing arrangement, e.g., barrel-shaped rolling bodies
15 Inner shaft seal ring
16 Further bearing, e.g., rolling bearing, e.g., ball bearing
17 Second housing part
18 Outer shaft seal ring
19 Third housing part
20 Connecting screws
80 First eccentric region
81 Second eccentric region
82 Third eccentric region
83 Third roller
84 Bearing ring of the third eccentric bearing 85 Bearing ring of the second eccentric bearing
86 Bearing ring, e.g., inner ring, of the first eccentric bearing
87 Rolling body of the second eccentric bearing
88 Second roller
89 Third roller
90 Stiffening ring
130 Nominal curve of the cam disk
131 Tip relief
132 Root relief
141 Recess for accommodating the first roller 6
142 Recess for accommodating the second roller 88
143 Recess for accommodating the third roller 89
144 Running surface for the rolling body 87 of the second eccentric bearing
145 Notch, e.g., shaped pocket end
180 Ball as rolling body of the second eccentric bearing
190 Third spacer ring with nubs
191 First spacer ring with nubs
192 Second spacer ring with nubs

The invention claimed is:

1. A drive, comprising:
a transmission adapted to be driven by an electric motor and including a drive shaft having eccentric regions, each respective eccentric region being radially surrounded by a respective cam disk region of a first housing part of the transmission;
wherein respective rollers are accommodated in respective first recesses of a cage and arranged with a radial degree of freedom;
wherein the cage is rotationally fixed to an output shaft of the transmission;
wherein the first recesses of the cage are rectangular slot-shaped; and
wherein on a first spacer ring radially projecting nubs project into the first recesses and axially delimit first rollers.

2. The drive according to claim 1, wherein the drive shaft of the transmission includes at least two eccentric regions with differing widths in an axial direction, high points of the at least two eccentric regions being offset relative to one another in a circumferential direction;
wherein the first recesses radially pass through the cage and are evenly spaced from one another in the circumferential direction;
wherein an axial end region of the first recesses is rounded and/or semicircular;
wherein a first one of the nubs of the first spacer ring projects into a respective first recess and axially delimits a first roller accommodated in this first recess;
wherein a nub of the first spacer ring next adjacent to this first one of the nubs of the first spacer ring projects into a respective second recess of the cage and axially delimits a second roller accommodated in the second recess;
wherein the second recess is axially spaced from the first recess;
wherein the respective rollers are adapted to roll and/or slide on the respective cam disk region by the respective eccentric region during operation of the drive;
wherein widths $B\_i$ of the eccentric regions and circumferential angle positions $\alpha\_i$ of the high points associated with the respective eccentric region are formed such that a sum of all products $B\_i * \cos(\alpha\_i)$ is eliminated and that a sum of all products $B\_i * \sin(\alpha\_i)$ is eliminated, i numbering the eccentric regions; and
wherein the eccentric regions are arranged behind one another in the axial direction to minimize and/or eliminate dynamic imbalance.

3. The drive according to claim 1, wherein the first housing part is connected to a second housing part, the output shaft and the cage are rotatably mounted both relative to the cam disk regions and relative to the drive shaft, the output shaft includes a wedge-shaped and/or V-shaped groove that is uninterrupted and/or fully circumferential in the circumferential direction, in which rolling bodies are accommodated, and a V-shaped recess is delimited in the axial direction by the first housing part and against the axial direction by the second housing part.

4. The drive according to claim 3, wherein a first rolling region of the rolling body is arranged on a flank of the groove and a second rolling region of the rolling body is arranged on the first housing part or on the second housing part, the V-shaped recess is arranged radially outside the groove, the second housing part has axial bores adapted to connect a device to be driven by the transmission of the drive, and the output shaft has axial bores at an axial end region facing away from the cage adapted to connect to a rotatably mounted part of the device to be driven.

5. The drive according to claim 1, wherein a stiffening ring is provided on the cage.

6. The drive according to claim 5, wherein the stiffening ring is aligned coaxially to the cage and coaxially to the output shaft, and a radial wall thickness of the cage in a region covered by the stiffening ring in the axial direction is greater than a wall thickness of the cage outside the region.

7. The drive according to claim 1, wherein an inner radius of a first cam disk region depends periodically on a circumferential angle, and the first cam disk region in the axial direction includes a region covered by the respective first roller in the axial direction.

8. The drive according to claim 1, wherein an outer radius of the drive shaft in the respective eccentric region depends on a circumferential angle.

9. The drive according to claim 1, wherein an axial region covered by the respective eccentric region at least overlaps with an axial region covered by the cam disk region, and the cam disk region touches a same roller as the respective eccentric region.

10. The drive according to claim 1, wherein the drive shaft is rotationally fixed to a rotor shaft of the electric motor and/or is adapted to be driven by the rotor shaft of the electric motor via one or a plurality of gear stages.

11. The drive according to claim 10, wherein a first toothed part is rotationally fixed to the rotor shaft and a second toothed part is rotationally fixed to the drive shaft.

12. The drive according to claim 1, wherein the cam disk regions are arranged on an inside of the first housing part of the transmission, the first housing part is connected to a second housing part, and rolling bodies of a bearing arrangement of the output shaft are delimited by the first housing part, by the second housing part, and by the output shaft.

13. The drive according to claim 12, wherein the output shaft has a running surface for the rolling bodies and the second housing part has a running surface for the rolling bodies, the output shaft has a V-shaped, fully circumferential in the circumferential direction, annular groove in which the rolling bodies are accommodated, a further V-shaped recess that is fully circumferential in the circumferential direction, in which the rolling bodies are accommodated and which has an orientation reversed to the V-shaped annular groove, is formed and/or edged by the first and second housing part.

14. The drive according to claim 1, wherein a bearing is arranged on a first eccentric region, on which first rollers are adapted to roll and/or slide directly or on which a ring is arranged, on which the first rollers adapted to roll and/or slide.

15. The drive according to claim 1, wherein an inner radius of the respective cam disk region depends periodically on a circumferential angle, an outer radius of the drive shaft in the respective eccentric region depends on the circumferential angle, an axial region covered by the respective eccentric region at least overlaps with an axial region covered by the respective associated cam disk region, and/or a respective bearing is arranged on the respective eccentric region.

16. The drive according to claim 1, wherein the cam disk regions are formed integrated in the first housing part, which is connected to the second housing part, in which a bearing arrangement is accommodated, which rotatably supports the output shaft.

17. The drive according to claim 1, wherein a shaft seal ring is arranged in the output shaft and seals towards the drive shaft, and a further shaft seal ring is arranged in the second housing part and seals towards the output shaft.

18. The drive according to claim 1, wherein a third housing part is connected to the first housing part and is connected to a housing of the electric motor that is adapted to drive a first gear wheel that is in mesh with a second gear wheel that is rotationally fixed to the drive shaft, the third housing part at least partially surrounding the first and second gear to form the housing.

19. A drive, comprising:
a transmission adapted to be driven by an electric motor and including a drive shaft having multiple eccentric regions with differing widths in an axial direction, high points of the eccentric regions being offset relative to one another in a circumferential direction;
wherein the respective eccentric region is radially surrounded by a respective cam disk region;
wherein, corresponding to the different widths of the respective eccentric regions, rollers with differing widths in the axial direction are accommodated in respective recesses of a cage and arranged with a radial degree of freedom;
wherein the cage is rotationally fixed to an output shaft of the transmission;
wherein the output shaft and the cage are rotatably mounted both relative to the cam disk regions and relative to the drive shaft;
wherein respective rollers are adapted to roll and/or slide on the respective cam disk region by the respective eccentric region during operation of the transmission;
wherein the rollers and/or eccentric regions with differing widths are arranged behind one another in the axial direction to minimize and/or eliminate dynamic imbalance;
wherein first recesses of the cage are rectangular slot-shaped; and
wherein on a first spacer ring radially projecting nubs project into the first recesses and axially delimit first rollers.

20. The drive according to claim 19, wherein the first recesses radially pass through the cage;
wherein widths $C\_i$ of the rollers and a width $C\_i$, and circumferential angular positions $\alpha\_i$ of the high points associated with the respective eccentric region are formed such that a sum of all products $C\_i * \cos(\alpha\_i)$ is eliminated and that a sum of all products $C\_i * \sin(\alpha\_i)$ is eliminated, i numbering the eccentric regions;
wherein a respective axial end region of the slot-shaped recess is rounded and/or semicircular;
wherein a first nub of the first spacer ring projects into a first recess and axially delimits a first roller accommodated in the first recess;
wherein a second nub of the first spacer ring next adjacent to the first nub of the first spacer ring projects into a respective second recess of the cage and axially delimits a second roller accommodated in the second recess;
wherein the second recess is axially spaced from the first recess.

21. A drive, comprising:
a transmission adapted to be driven by an electric motor and including a drive shaft having a first eccentric region radially surrounded by a first cam disk region;
wherein first rollers are accommodated in first recesses of a cage and arranged with a radial degree of freedom;
wherein the drive shaft includes a second eccentric region radially surrounded by a second cam disk region;
wherein second rollers are accommodated in second recesses of the cage and arranged with a radial degree of freedom;
wherein the drive shaft includes a third eccentric region radially surrounded by a third cam disk region;
wherein third rollers are accommodated in third recesses of the cage and arranged with a radial degree of freedom;
wherein the cage is rotationally fixed to an output shaft of the transmission;
wherein the first eccentric region is arranged in an axial direction between the second and the third eccentric region;
wherein the output shaft and the cage are rotatably mounted both relative to the cam disk regions and relative to the drive shaft;
wherein rollers are adapted to roll and/or slide on the respective cam disk region by the respective eccentric region during operation of the drive;
wherein the first recesses of the cage are rectangular slot-shaped;
wherein on a first spacer ring radially projecting nubs project into the recesses and axially delimit the first rollers.

22. The drive according to claim 21, wherein the first recesses radially pass through the cage;
wherein the second recesses radially pass through the cage;
wherein the third recesses radially pass through the cage;
wherein an extension of the rectangular slot-shaped first recesses is greater in the axial direction than in the circumferential direction;
wherein a respective axial end region of the slot-shaped recess is rounded and/or semicircular;
wherein a first nub of the first spacer ring projects into a first recess and axially delimits a first roller accommodated in the first recess;
wherein a second nub of the first spacer ring next adjacent the first nub of the first spacer ring projects into a respective second recess of the cage and axially delimits the second roller accommodated in this second recess;
wherein the second recess is axially spaced from the first recess; and
wherein the first rollers are adapted to roll and/or slide on the first cam disk region by the first eccentric region, the second rollers are adapted to roll and/or slide on the second cam disk region by the second eccentric region, and the third rollers are adapted to roll and/or slide on the third cam disk region by the third eccentric region.

23. The drive according to claim 22, wherein a sum of an axial width of the second eccentric region and the third eccentric region equals an axial width of the first eccentric region.

\* \* \* \* \*